(12) United States Patent
Mussolino et al.

(10) Patent No.: US 12,492,389 B2
(45) Date of Patent: Dec. 9, 2025

(54) MODIFIED Cas9 SYSTEM HAVING A DOMINANT NEGATIVE EFFECTOR ON NON-HOMOLOGOUS END-JOINING FUSED THERETO AND ITS USE FOR IMPROVED GENE EDITING

(71) Applicant: Albert-Ludwigs-Universitaet Freiburg, Freiburg (DE)

(72) Inventors: Claudio Mussolino, Freiburg (DE); Toni Cathomen, Freiburg (DE); Tatjana Cornu, Freiburg (DE); Antonio Carusillo, Freiburg (DE)

(73) Assignee: Albert-Ludwigs-Universitaet Freiburg, Freiburg (DE)

( * ) Notice: Subject to any disclaimer, the term of this patent is extended or adjusted under 35 U.S.C. 154(b) by 0 days.

(21) Appl. No.: 18/042,763

(22) PCT Filed: Jul. 26, 2021

(86) PCT No.: PCT/EP2021/070795
§ 371 (c)(1),
(2) Date: Feb. 23, 2023

(87) PCT Pub. No.: WO2022/048823
PCT Pub. Date: Mar. 10, 2022

(65) Prior Publication Data
US 2024/0043819 A1 Feb. 8, 2024

(30) Foreign Application Priority Data

Sep. 4, 2020 (EP) .................................... 20194524

(51) Int. Cl.
*C12N 9/22* (2006.01)
*C12N 15/90* (2006.01)

(52) U.S. Cl.
CPC ............ *C12N 9/22* (2013.01); *C12N 15/907* (2013.01); *C07K 2319/00* (2013.01); *C12N 2310/20* (2017.05)

(58) Field of Classification Search
CPC ................................. A61K 48/00; A61K 38/00
See application file for complete search history.

(56) References Cited

FOREIGN PATENT DOCUMENTS

WO WO-2019122302 A1 * 6/2019 ......... A61K 31/7088

OTHER PUBLICATIONS

Bartocci et al. (Front. Genet. 2013; 4: 128; pp. 1-12).*
Nakada et al. (J. Radiat. Res. Aug. 2016; 57 (Suppl 1): i33-i40).*
Muñoz et al. (J. Biol. Chem. Nov. 23, 2012; 287 (48):40618-28).*
Luijsterburg et al. (Elife. Feb. 27, 2017: 6: e20922; pp. 1-26).*
Charpentier et al. (Nat. Commun. Mar. 19, 2018; 9 (1): 1133; pp. 1-11).*
Carusillo et al. (Nucleic Acids Res. May 22, 2023; 51 (9): 4660-73).*
Nogueira et al. (Cancers (Basel). Nov. 2019; 11 (11): 1622; pp. 1-13.*
Vakulskas et al. (Nat. Med. Aug. 2018; 24 (8): 1216-24).*
Collias et al. (Nat. Commun. Jan. 22, 2021; 12 (1): 555; pp. 1-12).*
Sartori et al. (Nature. Nov. 22, 2007; 450 (7169): 509-14).*
Peisajovich et al. (Science. Apr. 16, 2010; 328 (5976): 368-72).*
Bashor et al. (Science. Mar. 14, 2008; 319 (5869): 1539-43).*
Sato et al. (PLoS Biol. Dec. 9, 2014; 12 (12): e1002012; pp. 1-13).*
Chen et al. (Adv. Drug Deliv. Rev. Oct. 15, 2013; 65 (10): 1357-69; author manuscript; pp. 1-32).*
Mali et al. Nature Methods Oct. 2013 10(10): 957-963) (Year: 2013).*
Carusillo et al. (Nucleic Acids Res. 2023 51(9): 4660-4663) (Year: 2023).*
M. Charpentier et al., *Nature Communications* (2018), 9(1133):1-11.
Eric Danner et al., *Mamm Genome* (2017), 28(7):262-274.
Rajeswari Jayavaradhan et al., *Nature Communications* (2019), 10 (2866):1-13.
Mingjie Liu et al., *Frontiers in Genetics* (2019), 9 (691):1-9.
Alexandre Orthwein et al., *Nature* (2015), 528(7582):422-426.
M. Charpentier et al., "CtIP fusion to Cas9 enhances transgene integration by homology-dependent repair", *Nature Communications*, 9:1133 (2018).
UniProt Citation AC Q99708 for "CTIP_HUMAN" (Dec. 2000).
P. Baumann et al., "Role of the human RAD51 protein in homologous recombination and double-stranded-break repair", *Trends Biochem Sci*, 23(7):247-51 (1998) (abstract only).
B. Bonilla et al., "RAD51 Gene Family Structure and Function", *Ann Rev Genet*, 54: 25-46 (2020).
I.E.Wassing et al., "The RAD51 recombinase protects mitotic chromatin in human cells", *Nature Communcations*, 12:5380 (2021).
A. Al-Fatlawi et al., "The Rad52 SSAP superfamily and new insight into homologous recombination", *Communications Biology*, 6: 87 (2023).
W-D. Heyer et al., "Rad54: the Swiss Army knife of homologous recombination", *Nucleic Acids Research*, 34(15): 4115-4125 (2006).
A. Li et al., "Homologous recombination DNA repair defects in PALB2-associated breast cancers", *npj Breast Cancer*, 5:23 (2019).
G. Keijzers et al., "Human Exonuclease (EXO1) Regulatory Functions in DNA Replication with Putative Roles in Cancer", *Int. J. Mol Sci*, 20:74 (2019).
Mali et al., *Science*, vol. 339(6121); 823-826 (2013).
Human codon optimized Cas9 nuclease for genome engineering https://www.addgene.org/41815 (accessed Dec. 3, 2024).
GenBank Accession No. Q99ZW2—full length SpCas9 https://www.ncbi.nlm.nih.gov/protein/Q99ZW2/ (updated Oct. 2, 2024, accessed Dec. 3, 2024).

* cited by examiner

*Primary Examiner* — Peter J Reddig
(74) *Attorney, Agent, or Firm* — Smith Patent, LLC; Chalin A. Smith

(57) ABSTRACT

The present invention relates to modified Cas9 nuclease comprising a substantial part of a Cas9 nuclease and fused thereto at least one substantial part of a dominant negative effector on non-homologous end-joining selected from the group consisting of RNF168, 53BP1, Ku80 and DNA-PK which compete with NHEJ promoting factors and CtIP.

12 Claims, 15 Drawing Sheets

Specification includes a Sequence Listing.

Figure 1A

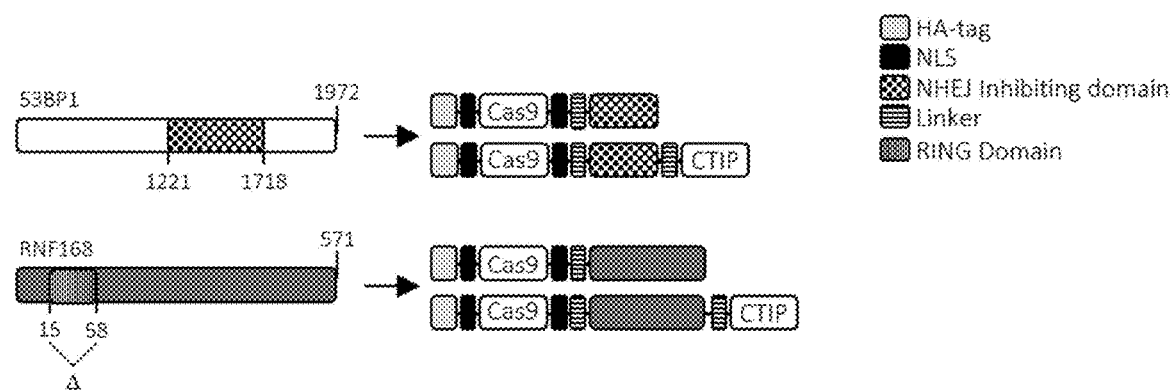

Figure 1B

Protein Sequence (dn53BP1 – 498aa):

GEEEFDMPQPPHGHVLHRHMRTIREVRTLVTRVITDVYYVDGTEVERKVTEETEEPIVECQECETEVSPSQTGGSS
GDLGDISSFSSKASSLHRTSSGTSLSAMHSSGSSGKGAGPLRGKTSGTEPADFALPSSRGGPGKLSPRKGVSQTGTP
VCEEDGDAGLGIRQGGKAPVTPRGRGRRGRPPSRTTGTRETAVPGPLGIEDISPNLSPDDKSFSRVVPRVPDSTRR
TDVGAGALRRSDSPEIPFQAAAGPSDGLDASSPGNSFVGLRVVAKWSSNGYFYSGKITRDVGAGKYKLLFDDGYEC
DVLGKDILLCDPIPLDTEVTALSEDEYFSAGVVKGHRKESGELYYSIEKEGQRKWYKRMAVILSLEQGNRLREQYGLG
PYEAVTPLTKAADISLDNLVEGKRKRRSNVSSPATPTASSSSSTTPTRKITESPRASMGVLSGKRKLITSEEERSPAKRG
RKSATVKPGAVGAGEFVSPCESGDNTGEPSALEEQ (Seq. ID No. 1)

Protein Sequence (RNF168 DRING – 526aa):

MALPKDAIPSLSECSSWTRYHTRRNSLVNVELWTIIQKHYPRECKLRASGQESEEVADDYQPVRLLSKPGELRREYE
EEISKVAAERRASEEEENKASEEYIQRLLAEEEEEEKRQAEKRRRAMEEQLKSDEELARKLSIDINNFCEGSISASPLNS
RKSDPVTPKSEKKSKNKQRNTGDIQKYLTPKSQFGSASHSEAVQEVRKDSVSKDIDSSDRKSPTGQDTEIEDMPTLS
PQISLGVGEQGADSSIESPMPWLCACGAEWYHEGNVKTRPSNHGKELCVLSHERPKTRVPYSKETAVMPCGRTES
GCAPTSGVTQTNGNNTGETENEESCLLISKEISKRKNQESSFEAVKDPCFSAKRRKVSPESSPDQEETEINFTQKLIDL
EHLLFERHKQEEQDRLLALQLQKEVDKEQMVPNRQKGSPDEYHLRATSSPPDKVLNGQRKNPKDGNFKRQTHTK
HPTPERGSRDKNRQVSLKMQLKQSVNRRKMPNSTRDHCKVSKSAHSLQPSISQKSVFQMFQRCTK (Seq. ID No. 2)

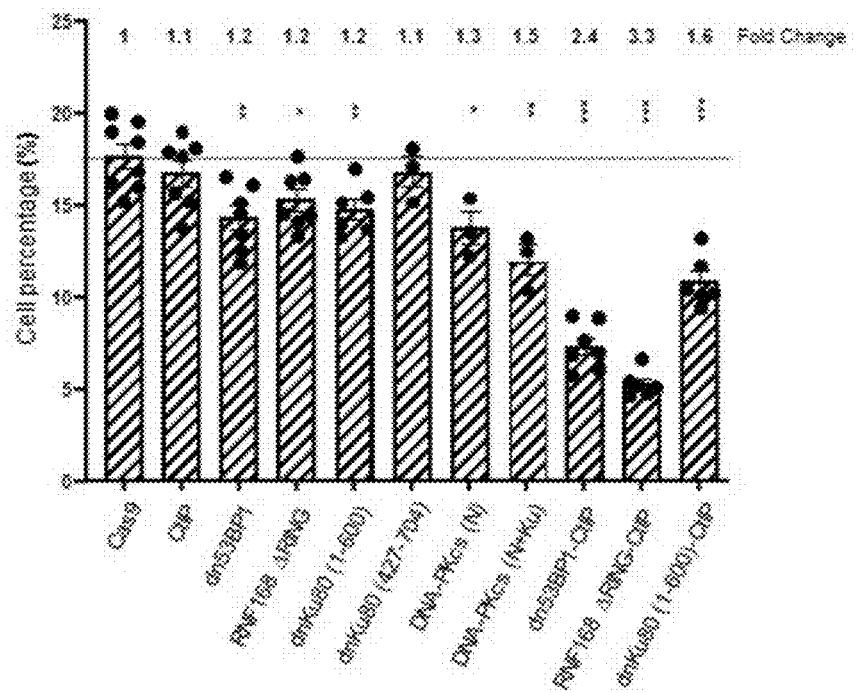

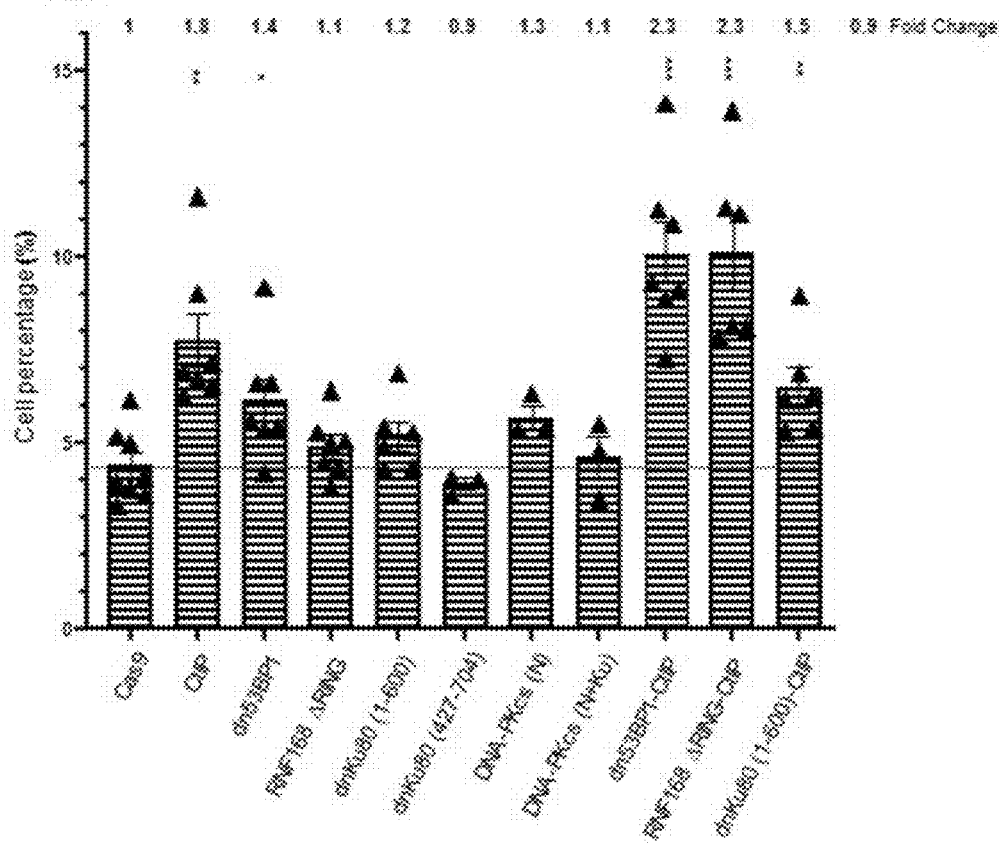

SEQUENCE LISTING

<160> NUMBER OF SEQ ID NOS: 2

<210> SEQ ID NO 1
<211> LENGTH: 498
<212> TYPE: PRT
<213> ORGANISM: artificial sequence
<220> FEATURE:
<223> OTHER INFORMATION: dn53BP1

<400> SEQUENCE: 1

```
Gly Glu Glu Glu Phe Asp Met Pro Gln Pro Pro His Gly His Val Leu
1               5                   10                  15

His Arg His Met Arg Thr Ile Arg Glu Val Arg Thr Leu Val Thr Arg
            20                  25                  30

Val Ile Thr Asp Val Tyr Tyr Val Asp Gly Thr Glu Val Glu Arg Lys
        35                  40                  45

Val Thr Glu Glu Thr Glu Glu Pro Ile Val Glu Cys Gln Glu Cys Glu
    50                  55                  60

Thr Glu Val Ser Pro Ser Gln Thr Gly Gly Ser Ser Gly Asp Leu Gly
65                  70                  75                  80

Asp Ile Ser Ser Phe Ser Ser Lys Ala Ser Ser Leu His Arg Thr Ser
                85                  90                  95

Ser Gly Thr Ser Leu Ser Ala Met His Ser Ser Gly Ser Ser Gly Lys
            100                 105                 110

Gly Ala Gly Pro Leu Arg Gly Lys Thr Ser Gly Thr Glu Pro Ala Asp
        115                 120                 125
```

```
Phe Ala Leu Pro Ser Ser Arg Gly Gly Pro Gly Lys Leu Ser Pro Arg
    130                 135                 140

Lys Gly Val Ser Gln Thr Gly Thr Pro Val Cys Glu Glu Asp Gly Asp
145                 150                 155                 160

Ala Gly Leu Gly Ile Arg Gln Gly Gly Lys Ala Pro Val Thr Pro Arg
                165                 170                 175

Gly Arg Gly Arg Arg Gly Arg Pro Ser Arg Thr Thr Gly Thr Arg
                180                 185                 190

Glu Thr Ala Val Pro Gly Pro Leu Gly Ile Glu Asp Ile Ser Pro Asn
                195                 200                 205

Leu Ser Pro Asp Asp Lys Ser Phe Ser Arg Val Val Pro Arg Val Pro
    210                 215                 220

Asp Ser Thr Arg Arg Thr Asp Val Gly Ala Gly Ala Leu Arg Arg Ser
225                 230                 235                 240

Asp Ser Pro Glu Ile Pro Phe Gln Ala Ala Gly Pro Ser Asp Gly
                245                 250                 255

Leu Asp Ala Ser Ser Pro Gly Asn Ser Phe Val Gly Leu Arg Val Val
                260                 265                 270

Ala Lys Trp Ser Ser Asn Gly Tyr Phe Tyr Ser Gly Lys Ile Thr Arg
            275                 280                 285

Asp Val Gly Ala Gly Lys Tyr Lys Leu Leu Phe Asp Asp Gly Tyr Glu
    290                 295                 300

Cys Asp Val Leu Gly Lys Asp Ile Leu Leu Cys Asp Pro Ile Pro Leu
305                 310                 315                 320

Asp Thr Glu Val Thr Ala Leu Ser Glu Asp Glu Tyr Phe Ser Ala Gly
                325                 330                 335

Val Val Lys Gly His Arg Lys Glu Ser Gly Glu Leu Tyr Tyr Ser Ile
                340                 345                 350

Glu Lys Glu Gly Gln Arg Lys Trp Tyr Lys Arg Met Ala Val Ile Leu
            355                 360                 365

Ser Leu Glu Gln Gly Asn Arg Leu Arg Glu Gln Tyr Gly Leu Gly Pro
    370                 375                 380

Tyr Glu Ala Val Thr Pro Leu Thr Lys Ala Ala Asp Ile Ser Leu Asp
385                 390                 395                 400

Asn Leu Val Glu Gly Lys Arg Lys Arg Ser Asn Val Ser Ser Pro
                405                 410                 415

Ala Thr Pro Thr Ala Ser Ser Ser Ser Thr Thr Pro Thr Arg Lys
                420                 425                 430

Ile Thr Glu Ser Pro Arg Ala Ser Met Gly Val Leu Ser Gly Lys Arg
            435                 440                 445

Lys Leu Ile Thr Ser Glu Glu Glu Arg Ser Pro Ala Lys Arg Gly Arg
    450                 455                 460

Lys Ser Ala Thr Val Lys Pro Gly Ala Val Gly Ala Gly Glu Phe Val
465                 470                 475                 480

Ser Pro Cys Glu Ser Gly Asp Asn Thr Gly Pro Ser Ala Leu Glu
                485                 490                 495

Glu Gln
```

<210> SEQ ID NO 2
<211> LENGTH: 527
<212> TYPE: PRT
<213> ORGANISM: artificial sequence
<220> FEATURE:
<223> OTHER INFORMATION: RNF 168 DRING -continued

```
<400> SEQUENCE: 2

Met Ala Leu Pro Lys Asp Ala Ile Pro Ser Leu Ser Glu Cys Ser Ser
1               5                   10                  15

Trp Thr Arg Tyr His Thr Arg Arg Asn Ser Leu Val Asn Val Glu Leu
            20                  25                  30

Trp Thr Ile Ile Gln Lys His Tyr Pro Arg Glu Cys Lys Leu Arg Ala
        35                  40                  45

Ser Gly Gln Glu Ser Glu Val Ala Asp Asp Tyr Gln Pro Val Arg
    50                  55                  60

Leu Leu Ser Lys Pro Gly Glu Leu Arg Arg Glu Tyr Glu Glu Glu Ile
65                  70                  75                  80

Ser Lys Val Ala Ala Glu Arg Arg Ala Ser Glu Glu Glu Glu Asn Lys
                85                  90                  95

Ala Ser Glu Glu Tyr Ile Gln Arg Leu Leu Ala Glu Glu Glu Glu
            100                 105                 110

Glu Lys Arg Gln Ala Glu Lys Arg Arg Ala Met Glu Glu Gln Leu
    115                 120                 125

Lys Ser Asp Glu Glu Leu Ala Arg Lys Leu Ser Ile Asp Ile Asn Asn
130                 135                 140

Phe Cys Glu Gly Ser Ile Ser Ala Ser Pro Leu Asn Ser Arg Lys Ser
145                 150                 155                 160

Asp Pro Val Thr Pro Lys Ser Glu Lys Ser Lys Asn Lys Gln Arg
            165                 170                 175

Asn Thr Gly Asp Ile Gln Lys Tyr Leu Thr Pro Lys Ser Gln Phe Gly
            180                 185                 190

Ser Ala Ser His Ser Glu Ala Val Gln Glu Val Arg Lys Asp Ser Val
        195                 200                 205

Ser Lys Asp Ile Asp Ser Ser Asp Arg Lys Ser Pro Thr Gly Gln Asp
    210                 215                 220

Thr Glu Ile Glu Asp Met Pro Thr Leu Ser Pro Gln Ile Ser Leu Gly
225                 230                 235                 240

Val Gly Glu Gln Gly Ala Asp Ser Ser Ile Glu Ser Pro Met Pro Trp
                245                 250                 255

Leu Cys Ala Cys Gly Ala Glu Trp Tyr His Glu Gly Asn Val Lys Thr
            260                 265                 270

Arg Pro Ser Asn His Gly Lys Glu Leu Cys Val Leu Ser His Glu Arg
        275                 280                 285

Pro Lys Thr Arg Val Pro Tyr Ser Lys Glu Thr Ala Val Met Pro Cys
    290                 295                 300

Gly Arg Thr Glu Ser Gly Cys Ala Pro Thr Ser Gly Val Thr Gln Thr
305                 310                 315                 320

Asn Gly Asn Asn Thr Gly Glu Thr Glu Asn Glu Ser Cys Leu Leu
                325                 330                 335

Ile Ser Lys Glu Ile Ser Lys Arg Lys Asn Gln Glu Ser Ser Phe Glu
            340                 345                 350

Ala Val Lys Asp Pro Cys Phe Ser Ala Lys Arg Arg Lys Val Ser Pro
        355                 360                 365

Glu Ser Ser Pro Asp Gln Glu Glu Thr Glu Ile Asn Phe Thr Gln Lys
    370                 375                 380

Leu Ile Asp Leu Glu His Leu Phe Glu Arg His Lys Gln Glu Glu
385                 390                 395                 400

Gln Asp Arg Leu Leu Ala Leu Gln Leu Gln Lys Glu Val Asp Lys Glu
                405                 410                 415
```

```
Gln Met Val Pro Asn Arg Gln Lys Gly Ser Pro Asp Glu Tyr His Leu
            420                 425                 430

Arg Ala Thr Ser Ser Pro Pro Asp Lys Val Leu Asn Gly Gln Arg Lys
            435                 440                 445

Asn Pro Lys Asp Gly Asn Phe Lys Arg Gln Thr His Thr Lys His Pro
    450                 455                 460

Thr Pro Glu Arg Gly Ser Arg Asp Lys Asn Arg Gln Val Ser Leu Lys
465                 470                 475                 480

Met Gln Leu Lys Gln Ser Val Asn Arg Arg Lys Met Pro Asn Ser Thr
                485                 490                 495

Arg Asp His Cys Lys Val Ser Lys Ser Ala His Ser Leu Gln Pro Ser
            500                 505                 510

Ile Ser Gln Lys Ser Val Phe Gln Met Phe Gln Arg Cys Thr Lys
            515                 520                 525
```

MODIFIED Cas9 SYSTEM HAVING A DOMINANT NEGATIVE EFFECTOR ON NON-HOMOLOGOUS END-JOINING FUSED THERETO AND ITS USE FOR IMPROVED GENE EDITING

PRIORITY

The instant application corresponds to the U.S. National phase of International Application No. PCT/EP2021/070795, filed Jul. 26, 2021, which, in turn, claims priority to European Patent Application No. 20194524.3 filed Sep. 4, 2020, the contents of which are incorporated by reference herein in their entirety.

SEQUENCE LISTING

The instant application contains a Sequence Listing compliant with WIPO Standard ST.26. The Sequence Listing, entitled "LNK_243US_SL_ST25.txt", was created Jun. 13, 2023, is 9,295 bytes in size and is hereby incorporated by reference in its entirety.

BACKGROUND OF THE INVENTION

Gene therapy relies on the use of genes to cure genetic defects identified in patients. In general, the approach of gene therapy can be used to reconstitute a function which is missing or lost in the diseased cells of the patient. In the last decades, gene therapy has been widely used to treat primary immunodeficiencies caused by mutations that inactivate key genes in the hematopoietic system. A typical gene therapy approach in this case is to use natural viral vectors, modified in a way that viral genetic elements are removed and substituted with an expression cassette encoding for the gene which is missing in the patient's cells. Hematopoietic cells derived from the patient can be then isolated and transduced with the recombinant vector; this results in the integration of the viral genome into the host genome leading to the expression of the gene harbored by the virus. As a consequence, the expression of the gene missing in patient cells is reconstituted from the new gene product delivered by the virus. The modified cells can be used as a gene therapy product and transplanted back to the original patient as a therapy. Even though this approach has shown successful for the treatment of multiple immunodeficiencies, it relies on the random mechanism by which the viral genome is integrated in the host cell. This poses serious safety concerns as integration close to oncogenes or oncosuppressors might lead to uncontrolled proliferation of the modified cells and, even if rare, such events can lead on the long run to the occurrence of cancer. Therefore, it is important to develop technologies to modify the target genome in a precise manner.

The correction of DNA breaks can occur either by homology-directed repair (HDR) which is typically much less efficient than the non-homologous end-joining (NHEJ) repair in mammals. Because of the low efficiency of HDR-based targeted genomic modification it is often far below the desired clinically relevant frequencies. The therapeutic potential of precise genome editing remains therefore a largely unexplored opportunity. Current strategies to increase the low rate of HDR-based gene editing rely mostly on the use of small molecule drugs to either block the cells in the S/G2 cell cycle phase, when the HDR pathway is most active or to inhibit the NHEJ. Typically such small molecules have a broad impact on cellular physiology and while they may be effective in some systems (mostly in vitro systems) their implication for clinically oriented studies might be undermined by safety concerns and an unfavorable risk/benefit ratio.

CRISPR-Cas9 technology enables gene editing in a sequence specific manner. Due to its simplicity and robustness, aside being a powerful tool for basic research it also holds great promise for clinical applications. Precise genome modification requires that CRISPR mediated DNA double-stranded break (DSB) is repaired by homology directed repair (HDR) using a foreign DNA as template. However, in mammalian cells, the frequency of HDR-mediated repair is low and generally the Non-Homologous End-Joining (NHEJ) repair pathway predominates, leading to non-precise genome editing. Given the importance of CRISPR technology for both basic and applied research, we aimed to fill this gap by developing a solid platform that will enable a more precise CRISPR-Cas9-mediated genome editing, with special interest toward clinically orientated applications.

WO 2019/089623 discloses fusion proteins comprising a gene-editing nuclease enzyme (Cas9) with a dominant-negative variant of a p53-binding protein 1 (53BP1) wherein the dominant-negative 53BP1 variant is a truncated variant.

Jayavaradhan et al., Nature Communications, vol. 10, no. 1 (2019), pp 1-13, disclose a CRISPR-Cas9 fusion to a dominant-negative 53BP1 which enhances HDR and inhibits NHEJ specifically at Cas9 target sites.

Danner et al., Mamm. Genome (2017), 28: 262-274 describe control mechanisms of gene editing by manipulation of DNA repair mechanism such as suppressing NHEJ or activating HDR.

SUMMARY OF THE INVENTION

In the last decade, methods to precisely modify patient's own cells without using randomly integrating viral vectors have become more and more attractive. Precise modification of a genome includes both the integration of a gene expression cassette in a very precise location of the host genome previously validated to be safe when modified, the so-called "safe harbors", and the precise reversion of a disease causing mutation to the normal sequence. Both cases rely on delivering into the cells a fragment of exogenous DNA (the so-called donor DNA) homologous to the target site and containing either the expression cassette to be integrated or the normal sequence to correct the underlying mutation.

In order to allow the transfer of the genetic information from the exogenous DNA to the precise location of the genome to be modified, the cells use the mechanism of Homologous Recombination (HR) also called Homology Directed Repair (HDR). Typically, HDR is engaged rarely in mammalian cells but this frequency can be increased to a relevant extent if a DNA double strand break (DSB) occurs at the target site and at the same time a homologous donor DNA is provided. Thereby in the last 20 years, huge efforts have been devoted to characterize and improve platforms to create DSBs in specific genomic locations and this has resulted in the introduction of designer nucleases (DN) as zinc finger nucleases (ZFNs), transcription activator-like effector nucleases (TALENs) and CRISPR-Cas nucleases.

Among these, DNs based on the CRISPR-Cas systems are to date among the most widely used as a consequence of their versatility and efficiency. However, when a DSB occurs, mammalian cells rely mostly on the NHEJ DNA repair pathway to repair the break and survive. This pathway is error-prone and does not lead to the incorporation of the genetic information from the exogenous DNA to the DSB site. Even when using highly efficient DNs, HDR-mediated gene editing is still extremely inefficient as NHEJ-mediated correction of a DSB is preferred leading to small mutations at the site of the break.

This unbalance between NHEJ and HR strongly hampers the applicability of precise genome editing as novel therapeutic option for human disorders. Indeed, the frequency of precise genome editing events in hematopoietic stem cells, the most relevant cell type in the field of gene therapy of primary immunodeficiency, is highly variable and far below the desired threshold which would be significant for achieving therapeutic benefit in patients. To further increase the low rate of HR-based gene editing, several strategies have been adopted which typically use chemical compounds to change the physiological balance between NHEJ and HDR in favor of the latter. However, even though these strategies have shown promising in some cellular systems, their applicability in clinically relevant settings poses concerns due to the potential side effects related to their use. Therefore, there is a need to develop a novel platform to render HDR-mediated genome editing more efficient and potentially applicable into clinics.

Some years ago, a unique pathway has been discovered which is used by bacteria and archea to defend themselves from cellular invaders like plasmids or bacteriophages. Such defense mechanism has been designated as Clustered Regulatory Interspaced Short Palindromic Repeats (CRISPR) along with the CRISPR associated proteins which are shortly designated as Cas proteins. Meanwhile three different types of CRISPR-Cas systems have been identified in bacteria and archea, namely Type I, Type II and Type III. The Type II CRISPR system has been most commonly adapted for genome editing due to its simplicity requiring just one Cas protein, Cas9 and RNA components. The RNA components are required for bringing the nuclease to the desired site at the DNA sequence to be edited.

An engineered CRISPR-Cas9 system consists of the Cas9 DNA endonuclease and a chimeric single guide RNA (gRNA). The chimeric gRNA is a single strand RNA molecule that consists of 20 nucleotides, complementary to the genomic target site, and the remaining portion that folds in a tridimensional structure that interacts with the Cas9 to form a complex for subsequent cleavage.

CRISPR-Cas9 can be targeted to induce a DSB in a gene of interest (GOI). The DNA lesion created can be repaired via either the error-prone Non-Homologous End-Joining (NHEJ) or via the error-free homology directed repair (HDR). While the first pathway is amenable for the achievement of gene knock-out (KO), the second is the pathway of choice if a precise modification is required. However, in mammalian cells the HDR pathway engagement is restricted to certain phases of the cell cycle while NHEJ is always active. This eventually results in the predominance of NHEJ over HDR. Thus, affecting the rate of precise modifications.

Other researchers have tried to improve the precise gene editing rate by mainly using drugs. Such compounds are designed to either inhibit NHEJ factors, to up-regulate HDR factors or to force cells to linger in the phase of the cell cycle in which HDR-mediated repair of a DNA break is favored. However, although such approaches showed various degrees of success, they are all poisoned by the fact that the compounds employed are acting globally rather than locally. Thus, altering dramatically the cell physiology. Such side-effect cannot be overlooked, in particular in a clinically-related contest where the homeostasis of the cell should be preserved as much as possible to retain features like stemness and avoid occurrence of malignancy due to failure in the DNA repair mechanisms upon usage of such compounds.

According to the invention a direct fusion of the Cas9 to one or more proteins involved in critical steps of the HDR pathway is disclosed which bias the cell decision to engage HDR over NHEJ only at the DSB site. This will result on a local, rather than global, alteration of the DSB repair pathway to favor the activation of HDR.

The ability to precisely correct the genome of a cell harboring a certain disease-causing mutation is still an unmet need in particular in patient-derived primary cells. To contribute in overcoming this problem, the HDR-CRISPR system has been developed. This consists of a fusion between the preferably used Cas9 nuclease from *Streptococcus pyogenes* (SpCas9), with single or multiple protein or protein domains involved in the mechanism of homologous directed repair (HDR). The presence of HDR-promoting proteins or protein domains at the site of a double strand break introduced by the Cas9 nuclease, would drive the repair of the break via the HDR pathway.

BRIEF DESCRIPTION OF THE FIGURES

FIGS. 1A and 1B are schematic representations of a preferred embodiment of the present invention of the NHEJ-inhibiting HDR-CRISPR. FIG. 1A shows schematically the NHEJ-inhibiting domain (aa 1221-1718) of the NHEJ factor 53BP1 (squared box). This domain is isolated to generate the NHEJ-inhibiting factor dn53BP1 and is fused either to the Cas9 or to the Cas9 including the CTIP domain (particularly preferred embodiment). In an analogous manner, the RING domain (vertical lined box) of the NHEJ factor RNF168 (aa 15-58) has been removed (designated by A) in order to generate the NHEJ-inhibiting factor RNF168ΔRING and fused either to the Cas9 or to the Cas9 including also the CTIP. The different components of the HDR-CRISPR constructs depicted are indicated on the right side of the figure.

FIG. 1B shows the amino acid sequences of the preferred NHEJ-inhibiting factors, whereby the protein sequence of dn53BP1 is sequence ID No. 1 and the protein sequence of RNF168ΔRING is sequence ID No. 2.

FIG. 8A shows the extent of double strand breaks repaired via non-homologous end-joining (NHEJ). FIG. 8B shows the extent of homologous directed repair (HDR) which was measured via flow cytometry two days post transfections of the HEK293T-BFP cells. The extent of cells showing either no fluorescence as result of NHEJ events (as indicated by the absence of color in the bars of FIG. 8A) or green fluorescence (as indicated by horizontal lines in the bars of FIG. 8B) indicative of HDR-mediated double strand break repair is indicated (mean value ±S.E.M.). For the precise editing, the most efficient ssODN with longer homology arm left as identified in FIG. 7 and depicted in FIG. 6 was used. The average baseline NHEJ and HDR values obtained with the SpCas9 without any fusion partner are reported within the graph as dotted lines. The fold change relative to the SpCas9 without any fusion partner are reported on top. Statistically significant differences as compared to the SpCas9 without any fusion partner are reported within the graph (two-tailed, unpaired student's t-test, *P<0.05, P<0.01, *P<0.001). The best results were obtained with dn53BP1 and dn53BP1-CtIP or RNF168ΔRING-CtIP.

FIG. 11A shows schematically the target integration of the SA-T2A-GFP under the endogenous AAVSI promoter (shown as white arrow). The back boxes represent the homology arms required to drive the targeted integration. FIG. 11B provides the percentage of precise integration events measured as GFP (Green Fluorescent Protein) positive cells in Jurkat cells on the left side and in K-562 cells on the right side. As the data in FIG. 11C bear out, the efficiency is clearly increased by the construct according to the present invention (HDR-CRISPR) compared to cells containing Cas9 only or the donor only. FIG. 11D shows DNA repair events in percent, whereby the HDR is increased for the construct according to the invention. FIG. 11D shows the precision score of the construct according to the present invention (HDR-CRISPR) compared to a construct with Cas9 only. Note that precision score is calculated as ratio between HDR and NHEJ events.

In FIG. 12A the principle of the experiment is illustrated. FIG. 12B shows the HDR/NHEJ ratio when a ssODN is used as a donor template in CD34+ cells. FIG. 12C shows a comparison in T-cells and FIG. 12D shows a comparison in HSC cells. FIG. 12E shows the precision score and the total indels given as a percentage (FIG. 12F) and the +1 indels given as a percentage in FIG. 12G.

DETAILED DESCRIPTION OF PREFERRED EMBODIMENTS

Figure 2:
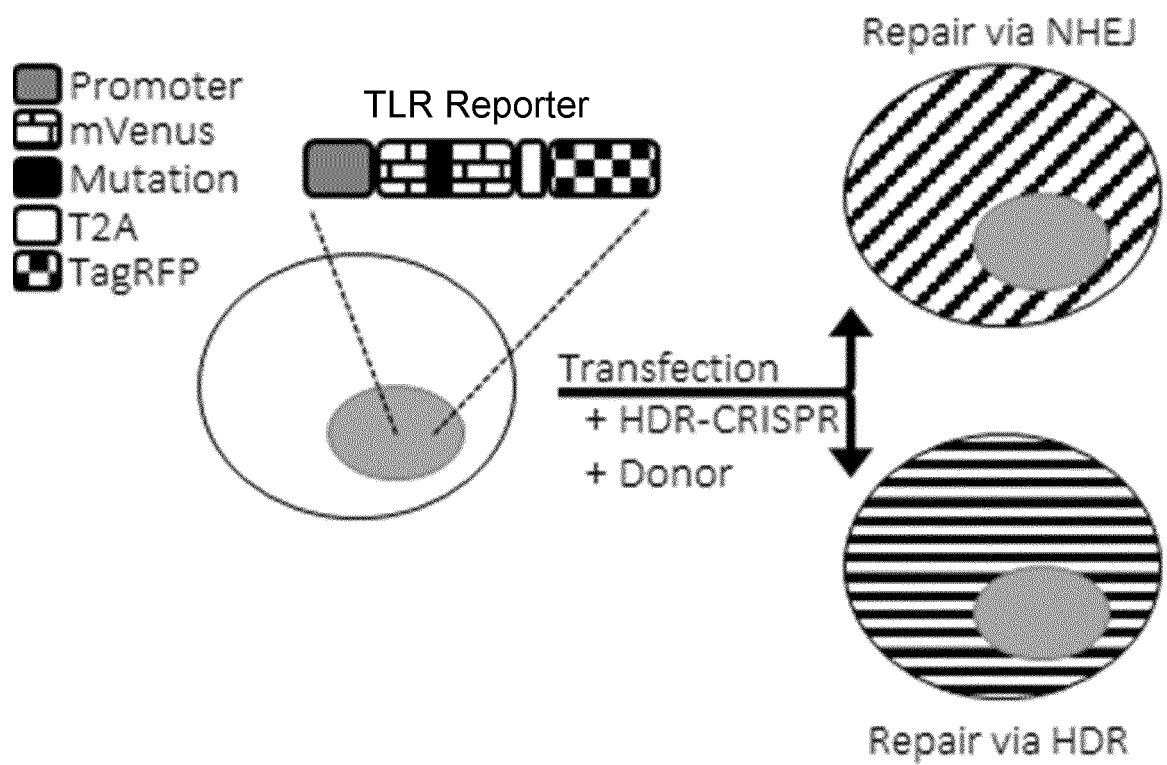
FIG. 2 shows schematically the reporter system used. The traffic light reporter system consists of a HEK293T-based cell line harboring integrated in its genome a copy of the indicated reporter construct composed of an mVenus gene with a mutation preventing its fluorescence, fused to an out-of-frame TagRFP gene via self-cleaving T2A peptide (TLR reporter). Upon transfection of the reporter cell line (TRL cells) with both the HDR-CRISPR and a properly designed donor DNA template for repair of the mVenus sequence, DNA repair events either mediated by non-homologous end-joining (NHEJ—diagonal lines) or homologous directed repair (HDR—horizontal lines) can be monitored by the occurrence of red or green cells respectively. The different colors (not shown) are responsible for the name "traffic light reporter system".

Preferred embodiments of the present invention are illustrated by the above Figures and the following Examples:

In one embodiment of the present invention the modified Cas9 nuclease which comprises at least a substantial part of the Cas9 nuclease which is fused to at least one substantial part of a dominant negative effector of non-homologous end-joining selected from the group consisting of RNF168, 53BP1, Ku80 and DNA-PKcs. The term "substantial part" of Cas9 nuclease or of the negative effector of non-homologous end-joining means that this part contains essential biological functions of the protein. Usually such a substantial part comprises at least 80%, preferably at least 85%, more preferred 90% and in particular preferred at least 95% of the sequence of the originally occurring sequence.

Depending on the desired effect, it is possible that in certain embodiments domains are removed or inactivated, whereby not all functions of the dominant negative effect are retained. In such embodiments, only about at least 40% of the entire protein are retained (compare with FIGS. 1A and 1B).

FIGS. 1A and 1B shows the identification of the essential parts of the two most effective factors capable of inhibiting efficiently NHEJ. The figures also show the amino acids sequence of the relevant NHEJ-inhibiting factor and the complete genome organizations of the 53BP1, and RNF168. The essential parts which were used in the constructs according to the invention are shown.

In an attempt of increasing the HDR:NHEJ ratio, the Cas9 was fused to at least one out of a selection of proteins or protein domains with negative effect on NHEJ. To this end, modified RNF168 and/or modified 53BP1, Ku80 and DNA-PKcs were selected:

RNF168: is an E3-ubiquitin protein ligase involved in ubiquitin-mediated signaling that drives the recruitment of factors involved in NHEJ, in particular 53BP1, via the ubiquitylation of the H2AK13/15.

P53 binding protein 1 (53BP1): together with RIF1 acts upstream of the NHEJ and antagonizes the HR by inhibiting the recruitment of key factors like BRCA1, BRCA2 and CtIP involved in mediating the DSB ends-resection, a key step that promotes the DSB repair via HDR.

Ku80: is part of a heterodimer together with Ku70, whose primary function is to "sense" the ends generated by the DSB and protect them from further processing through its direct binding. This in turn prevents the resection steps necessary for the engaging of the HDR.

DNA-PKcs: is one of the biggest PI3 kinase phosphatase proteins. DNA-PKcs besides working itself as steric hindrance preventing the interaction between HDR factors and DSB ends, it also promotes the recruitment of processing NHEJ factors like the ARTEMIS nuclease when the DSB ends cannot be sealed by the LigIV/XRCC4/XLF complex. Finally, it also stabilizes the complex itself, to favor the correct sealing of the gap.

The native, not modified proteins RNF168 and 53BP1 promote NHEJ. According to the present invention, however, modified proteins are preferably used thereof having the designation of RNF168deltaRING or dn53BP1. The relevant modifications of those two modified effectors are shown in FIGS. 1A and 1B schematically and the protein sequences of the deleted proteins are also shown in FIG. 1B.

Given their importance in the NHEJ pathway, those modified factors were identified as promising candidates to be fused to the Cas9 nuclease. In the strategy of the invention, it is intended to inhibit the binding and consequently the function of said NHEJ promoting factors by competition with engineered dominant negative (dn) variants fused to the Cas9. The presence of a dn variant at the DSB site should inhibit further recruitment or activity of other NHEJ promoting factors therefore favoring repair via HDR. In the present application either dn variants of NHEJ-promoting factors or generated new variant de novo were used. The functional domains of RNF168, 53BP1, Ku80 and DNA-PKcs responsible of promoting NHEJ were mutated or deleted, but the DNA binding domain was retained unaltered.

This allows the dominant negative factor to bind to the DSB site but without further activity as a consequence of the mutated or absent functional domain. Of note, the delivered inhibitory effect will be local and should not affect the delicate cell physiology. Importantly this approach is drug-free and alteration of DNA repair is exploited only at the site of the Cas9-induced DSB thus making this approach amenable for direct translation to more clinically relevant applications. Below the details of the different factors chosen are explained in more detail.

In case of RNF168, it was intended to eliminate its function to drive ubiquitylation, thus preventing the signaling driving the activation of other downstream NHEJ factors, such as 53BP1. Using a Gibson-Assembly based strategy a non-functional RNF168 variant was generated: dnRNF168ΔRing. This variant completely lacks the RING domain to impair the function of the RNF168 protein (FIGS. 1A and 1B). Importantly, the other regions of the protein known to play a role in DNA binding are kept unaltered. At first, fusion of the Cas9 to the aforementioned RNF168 mutant (Cas9-dnRNF168ΔRing) was constructed. The RNF168 variant dnRNF168ΔRing is preferably used in constructs according to the present invention. Since in previous experiments it has been shown that CtIP fusions to the Cas9 have the highest effect on improving precise gene editing, also variants in which the Cas9 was fused to CtIP and to the RNF168 mutant lacking the RING domain (Cas9-dnRNF168ΔRing-CtIP) were generated in preferred embodiments of the present invention.

Cas9-RNF168Δ-CtIP was then tested on primary cells. To this end Cas9-RNF168Δ-CtIP mRNA was in vitro transcribed to deliver to human primary hematopoietic stem cells (HSCs) and primary T lymphocytes. It was observed surprisingly that the overall HDR:NHEJ ratio could be substantially improved. One reason therefore may be that this was mainly due to a strong reduction in NHEJ events.

Since the reduction of NHEJ cannot be simply due to a lower activity of the Cas9-fusion it can be concluded that Cas9-RNF168Δ-CtIP can indeed bias cell decision by favoring cleaner DNA repair compared to the standard Cas9.

For 53BP1, a non-functional variant was formed containing only the so-called "minimal-focusing region" from amino acids 1120 to 1718 (FIGS. 1A and 1B). This region is responsible for recognizing the H4K20me2 at the DSB site and binding of this fragment inhibits NHEJ as shown by others. A single fusion Cas9-dn53BP1 and a double fusion Cas9-dn53BP1-CtIP was also generated.

Regarding Ku80, two independent fragments of the protein known to be involved in DNA binding were isolated. The two fragments span from amino acids 1 to 600 and 427 to 704. The two domains were either fused to the Cas9 only, resulting in Cas9-dnKu80(1-600) and Cas9-dnKu80(427-704) or the best performing was also fused to the Cas9-CtIP fusion, resulting in the Cas9-CtIP-dnKu80(1-600).

Finally, regarding the DNA-PKcs, the N-terminal domain from amino acids 1 to 426 (named N) and the putative Ku interaction site from amino acids 2000 to 2500 (named Ku) were isolated. Either only the N-terminal domain of the DNA-PKcs or both domains were fused to the Cas9 resulting in Cas9-dnDNA-PK(N) or Cas9-dnDNA-PK(N+Ku).

The Cas9 system was improved by engineering new factors to work as stand-alone fusions or in further embodiments to be combined with other features. In a further preferred embodiment the proteins having a negative effect on NHEJ can be combined with proteins having a positive effect on homology directed repair.

The HDR-CRISPR complex as described herein, includes to fusion of the Cas9 endonuclease to one or multiple effectors capable to bias DNA repair choice towards HDR. This molecule can be easily delivered to clinically relevant primary human cells in the form of mRNA/gRNA or as protein/gRNA. It offers therefore a strategy for improving HDR-based genome editing in therapeutically relevant cell types.

Cas9 wild type contains two nuclease domains designated as RuvC and HNH which each cut a different strand of the DNA. The HNH domain nicks the DNA strand that is complementary to the crRNA and the RuvC-like domain nicks the strand that is not complementary to the crRNA. Cas9 cleaves the DNA three base pairs upstream of the protospacer adjacent motif (PAM), resulting in a blunt-end cleavage of DNA. Cleaving the DNA is deleterious to the invading plasmid or virus, resulting in degradation and protection against these invaders. A double-strand break is highly efficient in the degradation of foreign DNA since the Cas9 induced double-strand breaks can be repaired by non-homologous end joining (NHEJ) which may easily result in insertions and/or deletions (indels). For genome editing the NHEJ is, however, disadvantageous.

In a further embodiment of the present invention the modified Cas9 nuclease comprises not only a dominant negative effector of non-homologous end-joining but also an effector capable of promoting homology directed repair. In those embodiments the construct comprises also a substantial part of any one of RAD51, RAD52, RAD54, MRE11, PALB2, FANCD2 and EXO1.

The modified Cas9 nuclease comprises at least one substantial part of a dominant negative effector and CtIP. In a further embodiment the modified Cas9 nuclease comprises additionally at least one substantial part of an HDR promoting effector. Charpentier et al., Nature Communications (2018) 9:1133 [DOI: 10.1038/s41467-018-03475-7] described the fusion of CtIP to Cas9 in order to enhance the transgene integration by homology-directed repair (HDR). CtIP is a 5' to 3' exonuclease involved in the processing of the DSB to create a 3'-ssODN. This seems to be a key step to channel the DNA repair toward HDR which seems to cooperate surprisingly with the dominant negative effector on non-homologous end-joining.

In a further embodiment the present invention relates to a nucleic acid coding for a construct for a modified Cas9 nuclease comprising either a dominant negative effector on non-homologous end-joining or a promoting effector of homology directed repair. In a further embodiment the nucleic acid coding for the modified Cas9 nuclease according to the present invention comprises further in addition to either the negative effector of NHEJ or the promoting effector of HDR or both, also the nucleic acid codons for CtIP. The nucleic acid can be either a DNA or an RNA, preferably a messenger RNA.

Usually the nucleic acid is provided in the format of a suitable vector for transfection of the desired target cells which contain in addition to the nucleic acid coding for the construct the elements of a vector which allow for a DNA to be introduced into the target cells. The vector can be in preferred embodiments either a plasmid or a viral vector or a vector containing essential parts of a viral vector. Viral vectors are preferably adenoviral vectors, adeno-associated viral (AAV) vectors, lentiviral and retroviral vectors. Such vectors provide efficient gene transduction and gene expression in probably more than 50% of gene therapy clinical trials.

The embodiments of the present invention can preferably be used for editing nucleic acid sequences following homology directed repair pathway. The advantage of such method is that very precisely mutations can be introduced and stably maintained in the target cells without negatively affecting the organism as a whole.

The so-called homology-directed repair (HDR) is for the genetic engineering more valuable since a precise modification of the sequence can be obtained. In order to make the activity of Cas9 more specific the RuvC catalytic domain may be inactivated for example by a single amino acid mutation that inactivates this domain. Such mutation may be for example the mutation D10A. A Cas9 having such a mutation has only the HNH catalytic domain which cuts just one strand of the DNA that is complementary to the sgRNA. Such variant is also designated "nickase Cas9" or "nCas9". In preferred embodiments such nCas9 are used for the homologous directed repair (HDR).

In a preferred embodiment of the present invention a modified Cas9 protein is disclosed which is able to instruct the DNA repair machinery of the cell to repair a double strand break (DSB) via the homologous directed repair (HDR) pathway with higher frequency as compared to physiological conditions. In particular, a fusion of an active nuclease, the Cas9 protein derived from *Streptococcus pyogenes* (SpCas9), and a combination of one or multiple factors involved in the HDR pathway for DNA repair is described.

The modified Cas9 complex according to the invention may be used in a system which can be designated shortly as "HDR-CRISPR". In general after the introduction of a double-strand break of the nucleic acid induced by Cas9 which is preferably derived from *Streptococcus pyogenes* the presence of HDR factors directly fused or linked to the Cas9 molecules at the target site drive the cell to repair the break in the DNA by engaging the HDR-mediated DNA repair pathway. One of the advantages of the preferred embodiments of the invention is the broad application since it can be used in all instances where precise DNA changes are required, as for example in order to correct a point mutation in cells derived from a patient. Alternatively, it can be used in order to integrate the expression cassette of a gene of interest in a very specific position of the target genome.

The novel Cas9 fusions, essential components of the HDR-CRISPR can be produced by recombinant means. In this case the nucleic acid coding for the Cas9 may be linked directly to genes coding for the HDR-promoting factors or to those coding for the NHEJ-inhibiting factors or to both and this construct may be inserted into a vector which may have viral or plasmid-derived components. Such a vector may be able to replicate in the host cell and to express the modified Cas9 protein comprising the preferred fusion factors which may be linked via an amino acid linker. Such modified Cas9 fusion proteins are typically expressed in a cell line from the plasmid that contains also a promoter which may preferably be derived from CMV (cytomegalovirus) followed by the construct.

It is a preferred embodiment of the present invention to deliver a modified Cas9 construct disclosed herein which is in the format of a replicable element into target cells which may be preferably human primary cells since there are several protocols available how such Cas9 proteins can be introduced into the target cells. Of course the RNA components (gRNA) required for the function of the CRISPR-Cas system must also be present in the target cells. Such RNA components can be present either on the same replicating unit or they can alternatively be present, e.g. in a further vector or several vectors.

In preferred embodiments of the present invention the modified Cas9 nuclease comprises at least a substantial part of the Cas nuclease which is required for the biological activity. At least one functional part or preferably the whole molecule of a HDR-promoting factor or an NHEJ-inhibiting factors or both are directly fused to the Cas9 via an amino acid linker.

The Cas9 nuclease is in preferred embodiments directly fused via a linker to the HDR-promoting factor or an NHEJ-inhibiting factors or both whereby the linker is expressed from the genetic construct coding thereof. In an alternative embodiment, however, the Cas9 nuclease may be linked to the chosen factors by a chemical linker. Such embodiment may be suitable for certain in vitro modifications of the genome.

The HDR factors which can be present in addition to the dominant negative effector on non-homologous end-joining are selected from the group consisting of the factors having the designation:
RAD51;
RAD52;
RAD54;
MRE11;
PALB2;
FANCD2;
EXO1.

In particularly preferred embodiments the HDR factors are selected from the group consisting of RAD51, RAD52 and MRE11.

Another protein which is added to the modified Cas9 construct is CtIP (CtBP interacting protein). CtIP may be added to the construct in addition to at least one of the HDR factors mentioned above or to the dominant negative effector on non-homologous end-joining. CtIP acts as a co-factor for MRE11 endonuclease in triggering DNA end resection.

The Cas9 nuclease fragment or the whole enzyme may be derived from different microorganisms like *Streptococcus pyogenes, Streptococcus thermophiles, Listeria monocytogenes, Staphylococcus aureus, Neisseria meningitidis, Campylobacter jejuni* or other bacteria whereby, however, the Cas9 derived from *Streptococcus pyogenes* is preferred.

In preferred embodiments of the present invention the construct comprises at least a dominant negative effector on non-homologous end-joining and one of the HDR factors, RAD51, RAD52 and Mre11. In another embodiment the modified Cas9 nuclease according to the invention comprises two and more preferred of those HDR factors. In further embodiments the construct may contain additionally CtIP.

In a further embodiment the modified Cas9 nuclease construct according to the present invention may comprise other functional parts like a hemagglutination tag and/or a promoter sequence preferably derived from CMV.

A further embodiment of the present invention relates to the nucleic acids coding for the modified Cas9 nuclease constructs as described herein which can be deduced from the amino acid sequence. Of course a suitable codon usage is selected and the required nucleic acid can be easily synthesized. Such nucleic acid sequences may be inserted into a suitable vector to express the construct. Such vectors may be derived from viral origin or from plasmid origin or may contain functional groups derived from such origins.

In another embodiment of the present invention, the Cas9 nuclease constructs as described herein may be used, preferably in the form of a nucleic acid contained within a suitable vector in a method for editing nucleic acid sequence in a homology-directed repair. Such methods may be used in order to treat patients whereby very precise modifications in certain relevant gene areas are required. By the method according to the present invention it is possible to change the sequence of a gene very precisely in order either to remove an undesired mutation or to induce a certain mutation either in a structural gene or in a regulatory gene sequence like a promoter or an activator and the like.

The method of editing genomic sequences encompasses the modified Cas9 construct as described herein which is usually inserted into the target cell via transfection, transduction, electroporation or cell fusion. The vector is designed in order to allow the replication of the vector in a target cell and the expression of the modified Cas9 complex as described herein. The required RNA sequences may also be encoded on the same vector or alternatively on another vector. It depends on the specific requirements whether all genetic elements required for editing the sequence are contained in one vector or are separated on several, preferably two or not more than three vectors. The use of a vector comprising all required elements is preferred.

The RNA sequences are in a preferred embodiment not further modified. The gRNA which is required for the CRISPR Cas genome editing at the desired position of the genome is made with a specific sequence which guides the Cas9 to the desired position.

To overcome the problem of low efficiency in HR-mediated genome editing and create a platform readily translatable to clinically oriented applications, HDR-CRISPR was developed. The present invention encompasses the physical fusion between an active Cas9 nuclease with one or multiple proteins or protein domains, involved in promoting the repair of a DSB through homologous recombination. In an alternative way it is, however, also possible to link the factors to the Cas9 nuclease by chemical linking methods. Linkers having functional ends which can react with the factors on the one hand and with the Cas9 molecule on the other hand are known to the person skilled in the art and can be used successfully. Such linking may be advantageous when in vitro steps like manipulation of gene sequences in cell cultures are performed.

It is assumed increased frequency of HDR-mediated genome editing is achieved by increasing the concentration of factors that promote the repair of a DSB via HDR precisely at the site of double strand break. The invention is applicable in any gene editing strategy that relies on homology directed repair for success. Moreover, the use of the platform in the form of in vitro transcribed mRNA or recombinant protein allows delivery directly in clinically relevant primary human cells without toxicity concerns as these delivery methods are relatively safe, well-established and used already in pre-clinical settings.

EXAMPLES

The present invention is further described in the experiments which were performed as follows:

In the specification the following abbreviations were used:

| | |
|---|---|
| 53BP1 | p53 binding protein 1 |
| BFP | blue fluorescent protein |
| BIR | break-induced replication |
| Bp | base pair |
| Cas | CRISPR-associated |
| cDNA | complementary DNA |
| CRISPR | clustered regularly interspaced short palindromic repeats |
| CtIP | CtBP-interacting protein |
| DN | designer nuclease |
| DNA | deoxyribonucleic acid |
| DSB | double-strand break |
| DSBR | double-strand break repair |
| EGFP | enhanced green fluorescent protein |
| GFP | green fluorescent protein |
| HDR | homology-directed repair |
| HR | homologous recombination |
| Kb | kilo base |
| KO | knock-out |
| mRNA | messenger RNA |
| gRNA | guide RNA |
| crRNA | programmable CRISPR RNA |
| NGS | next generation sequencing |
| NHEJ | Non-homologous end-joining |
| NLS | nuclear localization signal |
| RFP | red fluorescent protein |
| RNA | ribonucleic acid |
| SpCas9 | *Streptococcus pyogenes* Cas9 |
| TagRFP | red fluorescent protein |
| TALEN | transcription activator-like effector nuclease |
| TLR | traffic light reporter |
| ZFN | zinc-finger nuclease |

Example 1

In order to test the ability of our HDR-CRISPR systems to promote the repair of a double strand break via HDR, a traffic light reporter (TLR) system previously described was used (FIG. 2). In brief, the TLR construct integrated in the cellular genome of the reporter cells (TLR-cells) consists of a mutated green fluorescent protein (mVenus) fused to an out of frame red fluorescent protein (TagREP) via a T2A self-cleaving peptide. Since mVenus is mutated and the TagREP is out of frame, the cells harboring the reporter are neither green nor red.

Upon introduction of a DSB by the Cas9 at the site of the mutation in the mVenus sequence, repair via non-homologous end-joining (NHEJ) results in the occurrence of small insertion/deletion (indel) mutations, one third of which would restore the reading frame of the TagREP protein resulting in the appearance of red cells. If a proper donor template to correct the mVenus mutation is delivered into the cells together with the Cas9 nuclease, HDR events can be measured by the appearance of green cells. Consequently the so-called traffic light indicator allows a differentiation between NHEJ-mediated repair of the DNA break resulting in red cells and a HDR-mediated repair resulting in green cells with the higher percentage of the green cells indicating that the homology-directed repair is used more frequently by the cell. Thereby, the outcome of DNA repair, either NHEJ or HDR, can be easily monitored by flow cytometry in particular by counting the number of cells appearing either red or green. TLR-cells were transfected with a corrective plasmid donor DNA and each of the HDR-CRISPR tested in which the Cas9 nuclease is fused to each of the HDR-promoting factors described and results are reported in FIGS. 3A and 3B.

Example 2: TLR Assay

HEK-293T-TLR cells were seeded in a 24-well plate. 24 hours later, the cells were transfected with plasmids encoding the nuclease (375 ng), the gRNA (375 g) targeting the mVenus coding sequence, the plasmid DNA donor (375 ng) containing the mVenus correcting sequence and a plasmid coding for the TagBFP fluorescent protein (375 ng). The Cas9-CtIP fusion was used as positive control and the TagBFP expression vectors as transfection control. Three days after transfection, the HEK-293T-TLR cells were harvested and the percentage of TagRFP+ (NHEJ events) and mVenus+ (HDR events) cells was assessed via flow cytometry. The TagRFP+ and mVenus+ events were acquired after pre-gating on the TagBFP+ cells, in order to look only at the transfected cell population.

Figure 3A:
FIGS. 3A and 3B show the effect of the construct according to the invention of the NHEJ-inhibition via HDR-CRISPR system on DNA repair using the TLR reporter system. The extent of double strand breaks repaired via non-homologous end-joining (NHEJ) are shown in FIG. 3A. The extent of homologous directed repair (HDR) is shown in FIG. 3B. The extent was measured via flow cytometry three days post transfections of the TLR cells. The extent of cells either showing red or green fluorescence (not shown) are indicative of NHEJ or HDR-mediated double strand break repair, respectively. The values are presented as mean values ±S.E.M. Average baseline NHEJ and HDR values obtained with the SpCas9 without any fusion partner are reported within the graph as dotted lines. Fold change relative to the SpCas9 without any fusion partner are reported on top. Statistically significant differences as compared to SpCas9 without any fusion partner are reported within the graph (two-tailed, unpaired student's t-test, *P<0.05, P<0.01, *P<0.001).
Figure 3B:

As shown in FIG. 3A, most of the fusions showed significant decrease in NHEJ-mediated repair, measured as extent of cells turning red, as compared to the baseline frequency obtained using the sole Cas9 (indicated as Cas9). The most effective variants, Cas9-dn53BP1-CtIP and Cas9-dnRNF168ΔRing-CtIP showed reduction in NHEJ-mediated repair ranging from 2.4 to 3.3 fold respectively. Importantly, some engineered fusions also resulted in increased HDR-mediated repair measured as the appearance of green cells (FIG. 3B). In particular, Cas9-dn53BP1, Cas9-dn53BP1-CtIP and Cas9-dnRNF168ΔRing-CtIP resulted in the highest improvement of HDR frequency with an increase of 1.4, 2.3 and 2.3 fold as compared to the Cas9 control respectively.

Figure 4:
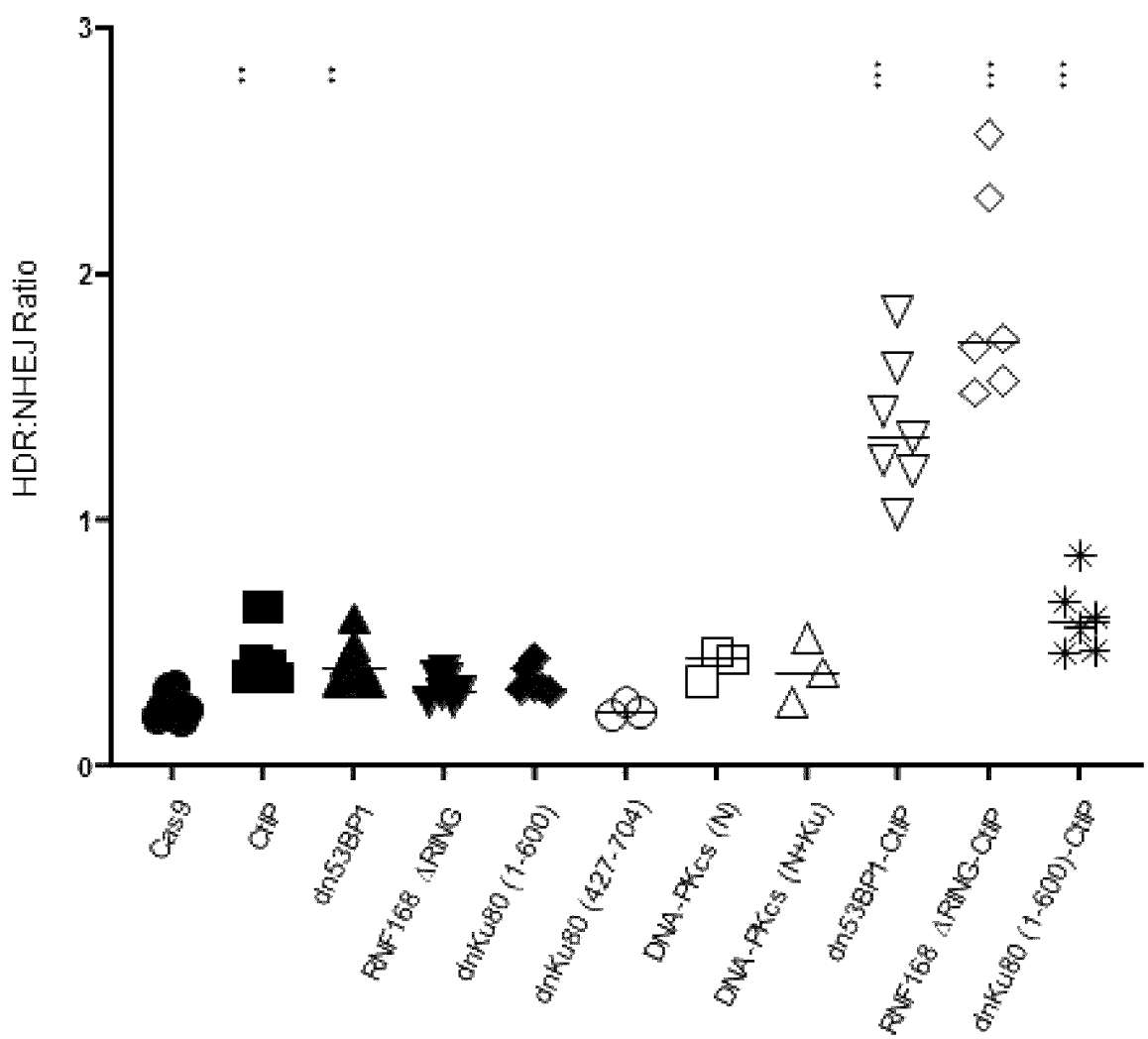
FIG. 4 is a different representation of the same results shown in FIGS. 3A and 3B. In this case, the data from FIGS. 3A and 3B are shown as ratio between the DSB repair events occurred either via HDR or NHEJ. Each dot represents a single experiment. Statistically significant differences as compared to the SpCas9 without any fusion partner are reported within the graph (two-tailed, unpaired student's t-test, *P<0.05, P<0.01, *P<0.001).

To better appreciate the impact the engineered HDR-CRISPR has on DNA repair, one can calculate the ratio between the HDR and NHEJ events as shown in FIG. 4. Using the unmodified Cas9, ~80% of the repair events are resolved via NHEJ resulting in a HDR:NHEJ ratio of about 0.2. This ratio increases up to 2 with our best HDR-CRISPR, up to 7-fold higher as compared to the Cas9 and 4-fold higher compared to the Cas9-CtIP single fusion considered as state-of-the-art.

Example 3: BFP to GFP Assay

Figure 5:
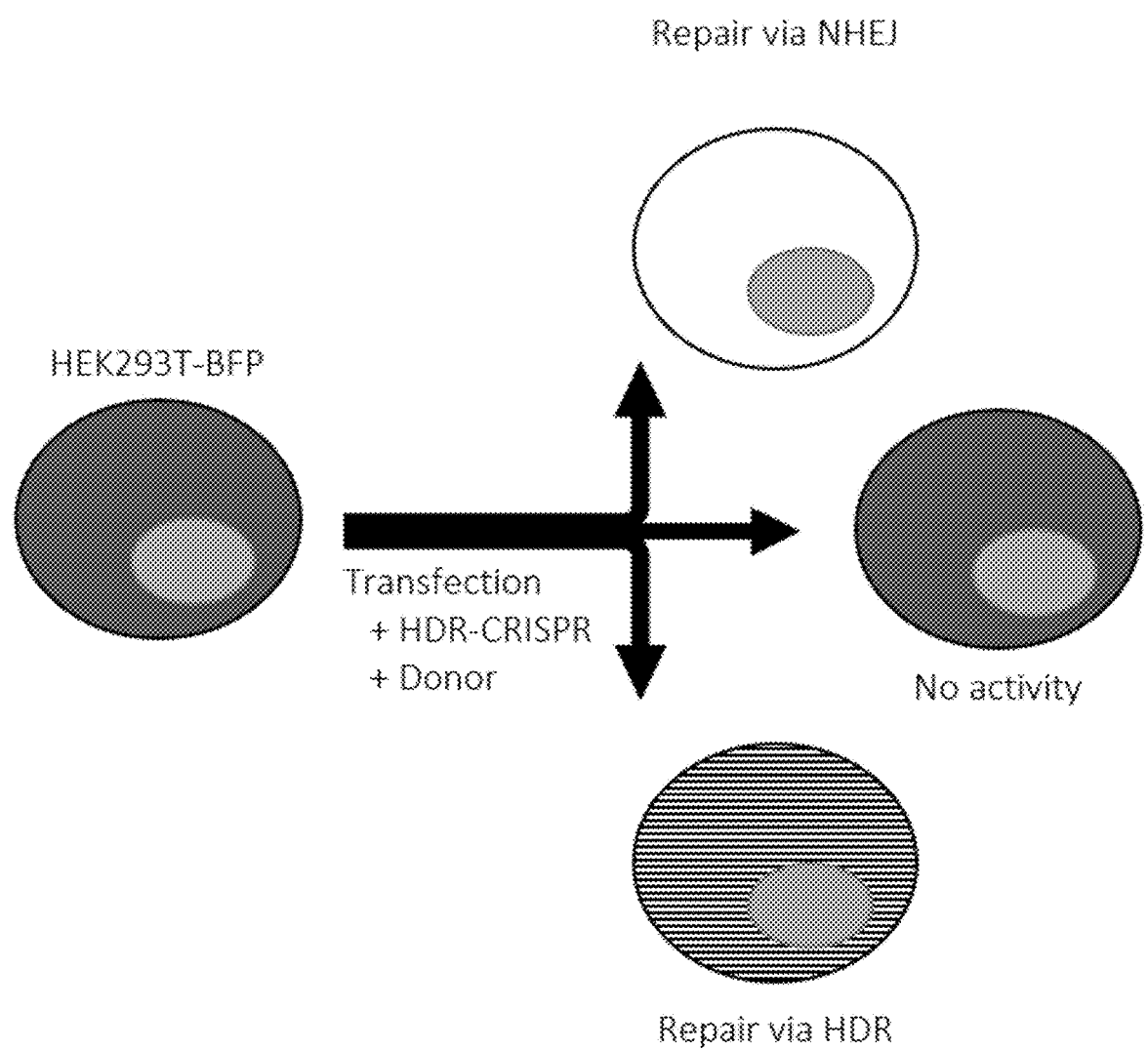
FIG. 5 shows schematically the result of the second reporter system. HEK293T-BFP cells are transfected with a mixture containing the selected HDR-CRISPR construct and a donor repair template either in the form of a single-stranded or a double-stranded oligodeoxynucleotide (ssODN or dsODN, respectively). Three days after transfection, the extent of double strand breaks (DSB) repaired either via NHEJ or HDR can be measured via flow cytometry. In the absence of nuclease activity, the cells remain blue (indicated by shading and the caption "no activity"). Double strand breaks repaired via NHEJ result in loss of fluorescence (indicated in the figure as a white cell). HDR-mediated repair using the sequence contained in the donor template results in the appearance of green cells (color not shown but rather indicated as a cell filled with horizontal lines).

To further test the ability of the newly developed HDR-CRISPR dn-fusions to inhibit NHEJ and promote HDR, a second assay was developed (FIG. 5) based on a blue fluorescent protein (BFP) stably integrated—via lentiviral transduction—in HEK-293T cells (named HEK293T-BFP cells). This assay takes advantage of the similarity between the BFP and GFP (green fluorescent protein) proteins, in which upon the introduction of a single nucleotide change (196C>T) it is possible to switch the emission of the fluorescent protein from blue to green. The change in the assay is introduced by supplying—together with the nuclease and the gRNA targeting the BFP coding sequence—a donor DNA designed to introduce the Single Nucleotide Polymorphism (SNP) required to achieve the switch from blue to green. Thus, the appearance of a green population will be indicative of the successful editing via HDR while the loss of blue fluorescence indicates NHEJ-mediated repair (FIG. 5). In this case, however, contrary to the TLR, the donor DNA is not a plasmid, but either a single-stranded oligodeoxynucleotide (ssODN) donor or a double-stranded oligodeoxynucleotide (dsDNA) donor of about 130 nucleotides. Using a different donor type (i.e. oligo vs. plasmid) allows us to see whether the activity of the Cas9 fusions depends also on the donor type used to deliver the desired modification.

Example 4: Donor Design

Contrary to the TLR, an ssODN or a dsDNA donor was used as template to introduce the SNP in the BFP to GFP assay. A first step is the proper design of the donor DNA. In particular, the following parameters are crucial for promoting HDR:

Distance from the cleavage site: the nucleotide edit should be inserted in the immediate proximity of the cleavage site. In fact, as many reported, the editing efficiency decreases immediately for modifications intended to be inserted+/−10 bp away from the cleavage site.

Homology Arms (HA): to ensure efficient editing efficiency, the desired modification should be embedded between sequences homologous to the cleavage site surrounding area (homology arms) whose length should be between 60 and 100 bp. Shorter homology arms would reduce the editing efficiency or promote not precise DNA repair pathways such as the Microhomology End-Joining or the Single Strand Annealing that rely on shorter homology arms.

PAM disruption: in order to avoid re-cutting from the Nuclease after correct SNP insertion, the PAM sequence—necessary to prime the nucleolytic activity of the Cas9-shall be disrupted by inserting silent mutations in the donor.

Figure 6:
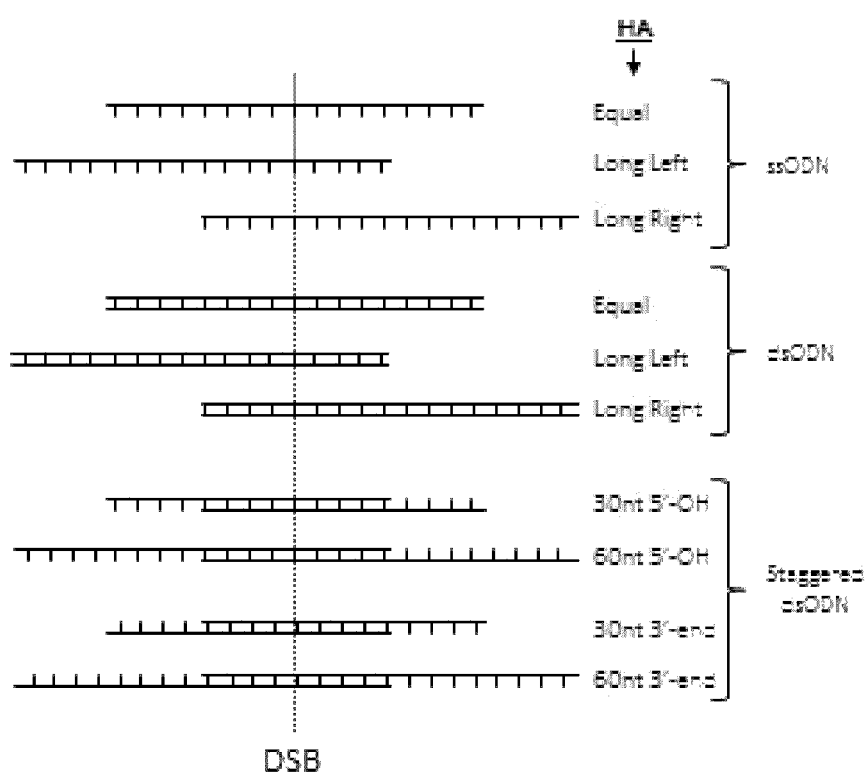
In FIG. 6, the schematics of the donor templates used in the assay are shown. Different donor templates are used to maximize blue fluorescent protein (BFP) to green fluorescent (GFP) conversion (not shown) via HDR-mediated repair of the DSB. Both the single-stranded or double-stranded oligodeoxynucleotides used are 131 nucleotides long and centered on the DSB site. Homology arms (HA) of equal or variable length are included as depicted both for ssODN and for dsODN. In addition, overhangs (OH) of different length are included either at the 5'-end or the 3'-end of the dsODN to generate staggered DNA templates. In this case, 131 or 191 nucleotides long oligodeoxynucleotides are used to generate the 30 nucleotide or 60 nucleotide staggered ends, respectively.

Based on these parameters, a donor DNA—ssODN or dsDNA—was designed which have in common the following features: i) the overall length was 131 nucleotides ii) in all the donor design, the SNP is localized in the center iii) the PAM is disrupted by changing the PAM from NGG to NCG. Beside these 3 main parameters, also the architecture of the ssODN or dsDNA homology arms may play a role and have an impact on the editing efficiency. Therefore, we explored different donor designs (FIG. 6):

ssODN whose homology arm left and right have the same length (60 bp). Same design was applied to dsDNA.

ssODN whose homology arms left and right are 90 bp and 30 bp respectively. Same design was applied to the dsDNA (named as ssODN_long left).

ssODN whose homology arms left and right are 30 bp and 90 bp respectively. Same design was applied to the dsDNA (named as ssODN_long right).

dsDNA whose homology arms presented a partial (30-bp) staggered overhang (OH) either at the 5'-end or at the 3'-end.

dsDNA whose homology arms presented a partial (60-bp) staggered overhang (OH) either at the 5'-end or at the 3'-end. In this case the length of the oligodeoxynucleotides is 191 nucleotides.

The rationale behind the different homology arm length, comes from previous reports in literature showing that improvement in editing efficiency could be observed when donor DNA was equipped with homology arms of different length. The concept of staggered overhangs in the homology arms is based on a different knowledge:

Rationale of having a staggered 3'-end. During DSB repair, the DNA filaments at the broken ends are typically resected until a 3'-end staggered homology arm end is recognized by the RPA protein. Later, the end is coated by RAD51 monomers to drive strand-invasion of the homologous sequence. We reasoned that by providing a donor that resembles the resected DNA filament prior strand-invasion could improve indeed the HDR mediated DNA repair.

Rationale of having a staggered 5'-end. As we mentioned in the previous point, during repair, there is the formation at the DSB site of 3'-end staggered DNA filaments. We reasoned that by providing a donor equipped with staggered 5'-homology arms matching the staggered 3'-homology arms at the genomic site would increase the HDR mediated DNA repair.

Example 5

Figure 7:
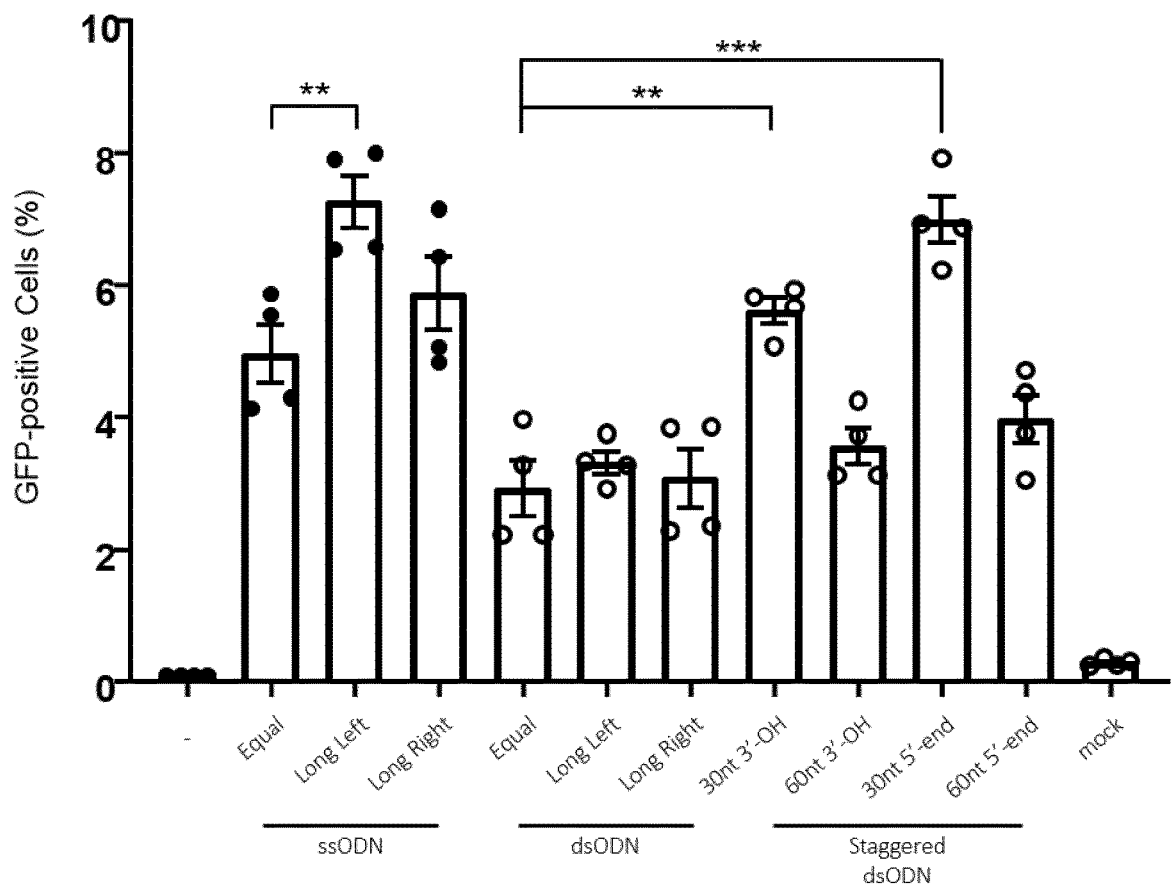
FIG. 7 is an identification of the most efficient donor design to drive HDR-mediated repair of DSB. The graph shows the extent of green fluorescent protein (GFP)-positive cells (not shown) resulting from precise BFP editing using the different DNA donor templates depicted in FIG. 6. The results are collected two days after transfection of the HEK293T-BFP cells with a mixture containing the SpCas9 without any fusion partner and the indicated DNA repair template. Non-transfected cells (-) and cells transfected only with the ssODN with equal homology arms template (mock) are indicated. Statistically significant differences, as compared to the sample receiving the ssODN or dsDNA with equal homology arms, respectively are reported within the graph (two-tailed, unpaired student's t-text, P<0.01, *P<0.001). As shown in the figure, the single-stranded long left donor showed superior results.

The different donor designs described above (FIG. 6) were tested using the unmodified Cas9 only. HEK293T-BFP cells were seeded in a 24-well plate. The day after cells were transfected with plasmid encoding the nuclease (100 ng), the gRNA (100 ng) and one of either type of ssODN (1 pmol~40 ng) or dsDNA (40 ng) described above. After 48 hours the cells were harvested and the percentage of GFP+ cells (indicative of HDR-mediated conversion of BFP to GFP) was assessed via flow cytometry. In this case, the efficacy of the different donor designs at promoting precise editing—in the contest of a standard Cas9 nuclease—was investigated. As it can be observed (FIG. 7), ssODN with an uneven homology arm design, in particular with a longer homology arm left, showed a statistically significant increase in precise editing efficiency as compared to canonical ssODN design. Longer homology arms though did not improve the dsDNA mediated editing. However, dsDNA donor with staggered homology arms, in particular a 5'-end staggered homology arm, showed a dramatic increase in editing efficiency compared to the dsDNA and performed as good as the optimized ssODN donor.

Based on these results, we selected the best performing donor architectures (ssODN with longer homology arm left and dsDNA with 5'-end staggered homology arm) for subsequent experiments.

Figure 8A:
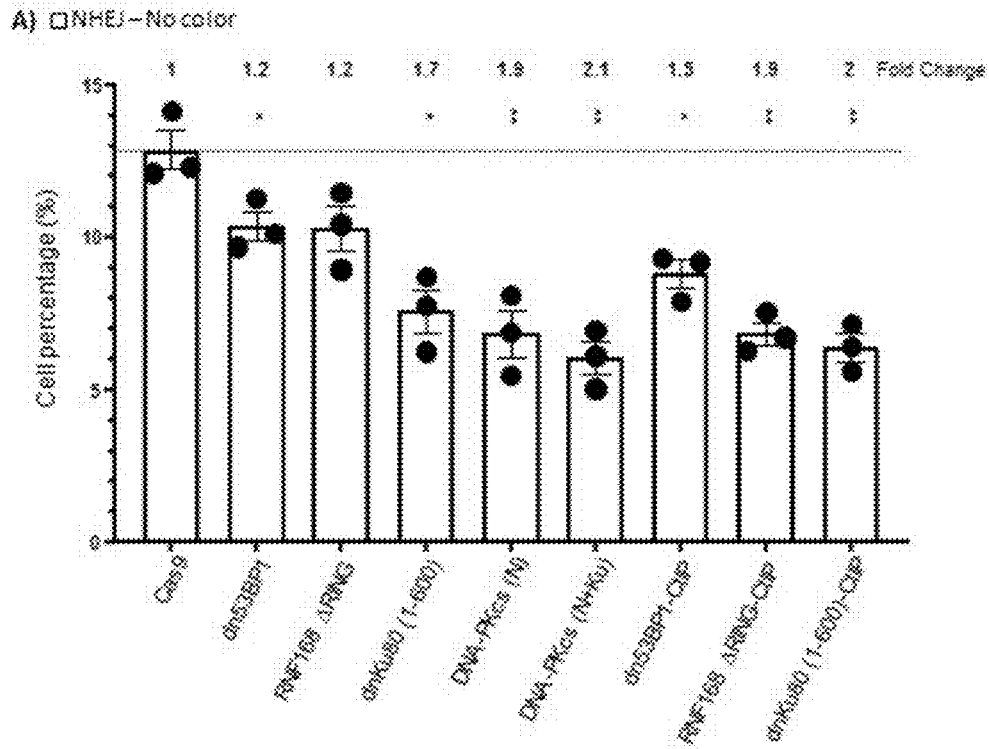
FIGS. 8A and 8B show the effect of different constructs according to the invention with the ssODN long left donor template.
Figure 8B:
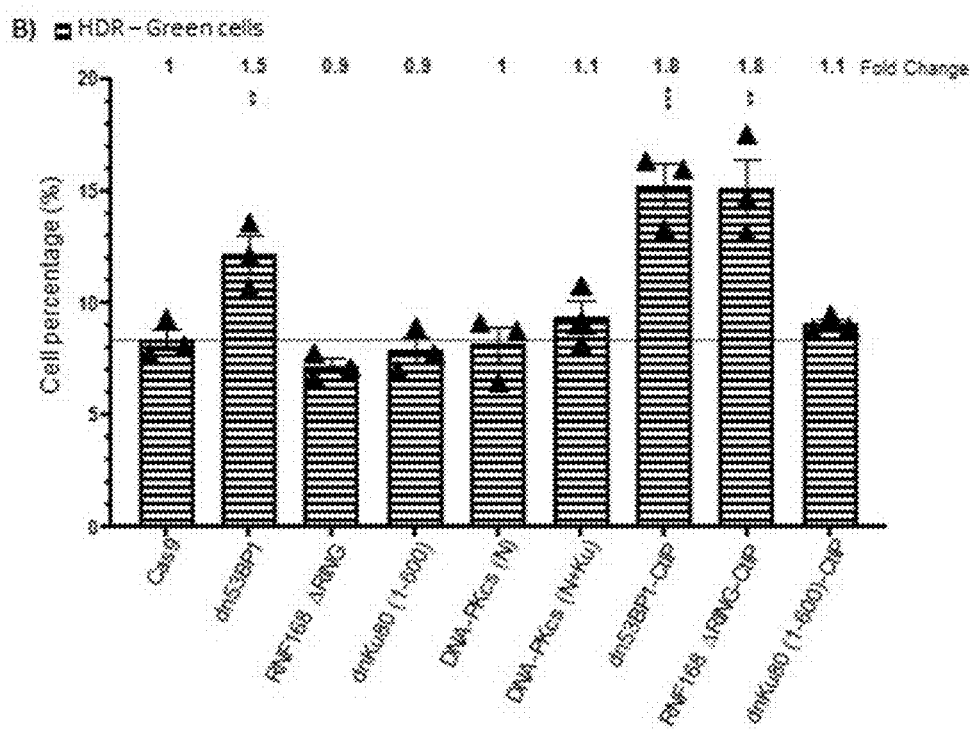

We next analyzed the efficiency of the novel HDR fusions at inducing precise editing, compared to the unmodified Cas9 in the presence of the optimized donors described above. As it can be observed (FIG. 8A), the novel fusions showed reduced NHEJ-mediated repair using the ssODN with longer homology arm left. In particular the HDR-CRISPR Cas9-CtIP-ΔRingRNF168 and Cas9-DNA-PKcs (N+Ku) resulted in NHEJ reduction of 1.9- and 2.1-folds respectively. In terms of HDR (FIG. 8B), we could observe a significant increase in precise editing, in particular when Cas9-CtIP-dn53BP1 and Cas9-CtIP-ΔRingRNF168 were used (1.8-fold increase in both cases), but not in the case of the double fusion CtIP-Ku80.

Figure 9A:
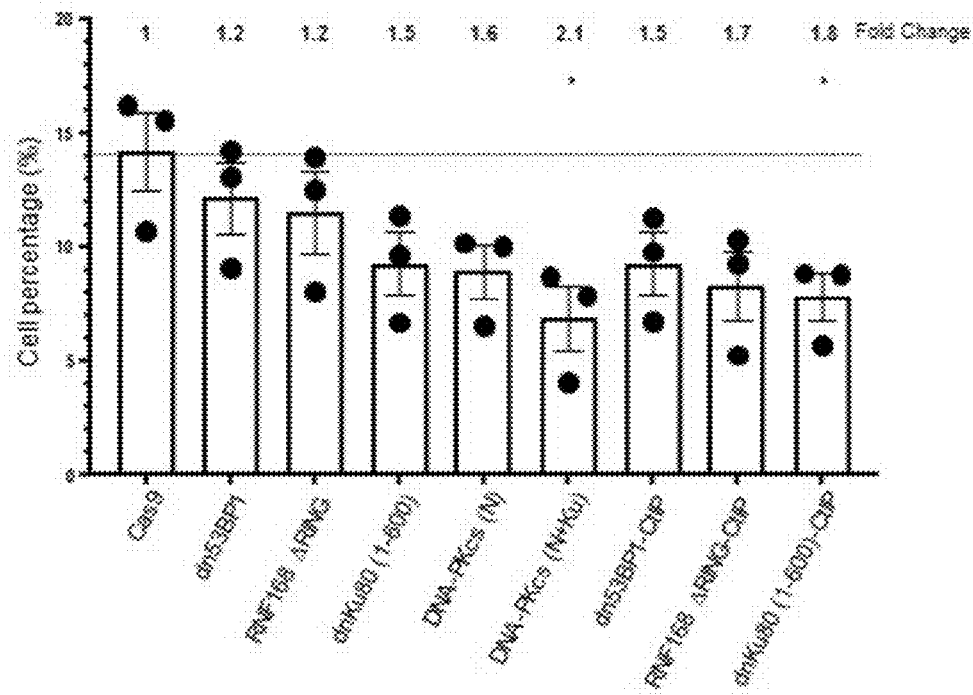
FIGS. 9A and 9B show the effect of another donor, namely the 30 nt 5'OH dsODN staggered donor. The extent of double strand breaks repaired via non-homologous end-joining (NHEJ) is shown in FIG. 9A and the extent of double strand breaks repaired via homologous directed repair (HDR) is shown in FIG. 9B. The measurement is made via flow cytometry two days post transfection of the HEK293T-BFP cells. The extent of cells either showing no fluorescence as result of NHEJ events or green fluorescence indicative of HDR-mediated double strand break repair is indicated (mean±S.E.M.). For the precise editing, the most efficient 30 nt 5'OH dsODN donor template identified in FIG. 7 was used. Average baseline NHEJ and HDR values obtained with the SpCas9 without any fusion partner (control) are reported within the graph, and this is shown as dotted lines. The fold change relative to the SpCas9 without any fusion partner is reported on top. Statistically significant differences as compared to SpCas9 without any fusion partner are reported within the graph (two-tailed, paired student's t-test, *P<0.05, P<0.01, *P<0.001). The superior results obtained with the constructs of the present invention are comparable to the results as shown in FIGS. 8A and 8B.
Figure 9B:
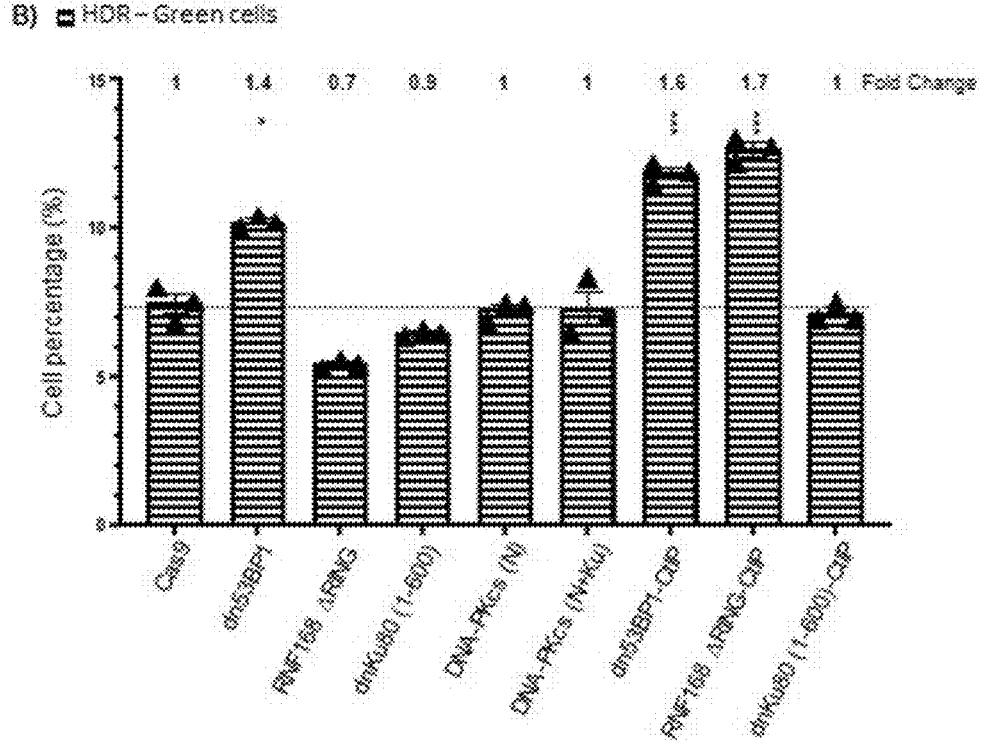

Upon using a dsDNA equipped with 5'-end staggered homology arms (FIGS. 9A and 9B) we could observe significant NHEJ reduction in case of most of the fusions (FIG. 9A). On the other hand, a significant HDR increase was observed in the case of the single fusion Cas9-dn53BP1 and the double fusions in which CtIP was fused to dn53BP1 or to RNF168ΔRing (FIG. 9B).

Overall the results from the BFP to GFP approach show that the novel fusions are able to deliver high gene editing and outcompete the Cas9, even in the case of a previously optimized donor DNA. Of interest it is the observation that compared to the TLR, the same factors conveyed a different degree of reduction in NHEJ and increase of HDR in the BFP to GFP assay. This paves the hypothesis that according to the donor DNA used—plasmid, ssODN or dsDNA—a different factor should be fused to the Cas9 in order to proper tailor the desired DNA repair outcome.

In the results provided it has been shown that by engineering dominant negative variant of key NHEJ factors and fusing them to the Cas9 nuclease it is possible to significantly hamper the NHEJ. Moreover, upon double fusion of HDR-enhancer like CtIP, it is possible to also simultaneously improve the HDR and achieve an unprecedented increase of the HDR:NHEJ ratio, up to 7-fold as compared to the unmodified Cas9. By using the TLR and BFP to GFP assay, we could show, in two different and unrelated systems, that this approach can systematically and robustly shift the DNA repair pathway decision from NHEJ to HDR. Moreover, along with novel Cas9 fusions, we optimized the DNA donor design with the aim of achieving improved editing efficiency even by using the unmodified Cas9. When HDR-CRISPR fusions were combined with optimized DNA donor design, we could obtain unprecedented frequencies of precise gene editing via HDR.

Since this approach acts locally and is drug-free, it does not represent a major concern for cell-physiology and safety. Therefore we envision that it has great potential for application aimed at the clinical translation.

Example 6

Figure 10:
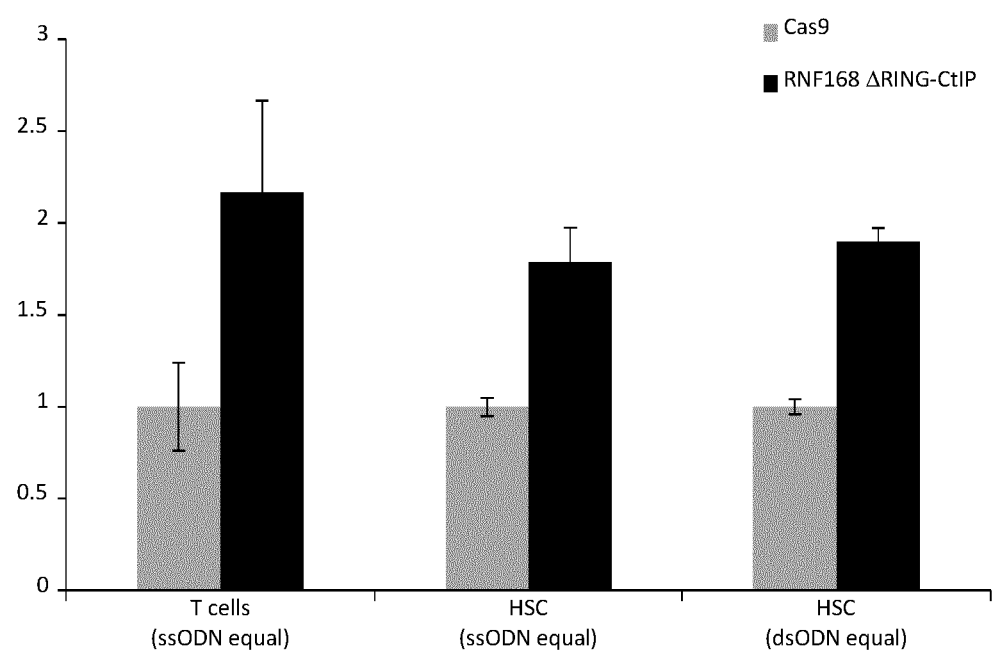
FIG. 10 shows the precision of genome editing in primary human T lymphocytes or hematopoietic stem cells (HSC). The graph shows the increase observed in the ratio between HDR and NHEJ events when using the construct according to the present invention (RNF168ΔRING-CtIP) compared with Cas9 alone. The experiments were performed in primary human T lymphocytes and hematopoietic stem cells (HSC). The simultaneous increase of HDR events together with a decrease in NHEJ events results in a two-fold higher HDR:NHEJ ratio when using the construct according to the invention as compared to SpCas9 without any fusion partner (mean±S.E.M.). Precise editing is achieved using both an ssODN or a dsODN with equal homology arms as shown in FIG. 6 and FIG. 7 (ssODN equal or dsODN equal, respectively).

The best performing HDR-CRISPR system identified, namely the Cas9_RNF168ΔRING-CtIP fusion, is then compared side-by-side with unmodified Cas9 for its ability to promote HDR-mediated precise DSB repair in primary human cells. This is highly relevant for future clinical application of HDR-CRISPR. To this end, both Cas9 and Cas9_RNF168ΔRING-CtIP were in vitro transcribed as mRNA, since plasmid DNA is highly toxic for primary cells. Using a synthetic-gRNA (sgRNA) produced by a commercial source (Synthego) we directed the nucleases to target the CCR5 locus. In order to evaluate the efficacy of introducing precise modification via HDR-CRISPR, we designed a 131 nucleotide long ssODN with equal homology arms to introduce three nucleotide changes upstream from the cleavage site. Peripheral blood mononuclear cell (PBMCs) were activated three days before nucleofection. On the third day, 20 pmol of nuclease mRNA, 112.5 pmol of sgRNA and 25 pmol of ssODN were nucleofected. After 6 days, T cells were harvested, and the genomic DNA extracted. The region encompassing the nuclease targeted was amplified via PCR and the frequencies of NHEJ and HDR were measured via Inference of CRISPR Edits (ICE) method. To this end, the PCR amplicon is sequenced via Sanger Sequencing and the results are processed by the ICE software provided online by Synthego. The software aligns the sequencing profiles of the non-edited samples (Control) to the edited samples and returns the editing frequencies. As shown in FIG. 10, delivery of the indicated HDR-CRISPR or canonical Cas9 in primary human T lymphocytes resulted in a 2-fold increase of precise editing when using HDR-CRISPR. This increase is a consequence of the reduced NHEJ-events and increased HDR-events which result in an overall increase of the HDR:NHEJ ratio when using the indicated HDR-CRISPR.

Example 7

Figure 11A:
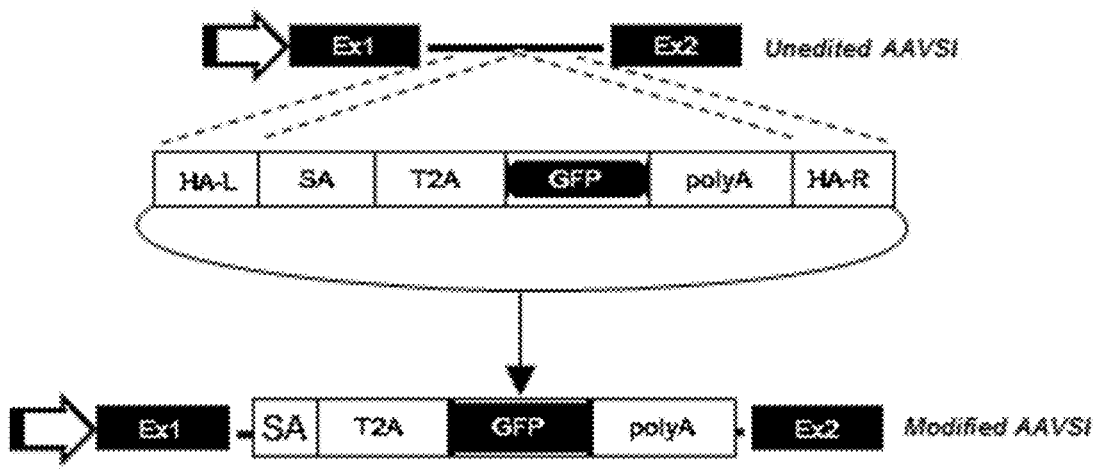
FIGS. 11A-D show the results of Example 7.

HDR-CRISPR Promotes Targeted Integration of Large Gene Expression Cassette in Cell Lines The HDR-CRISPR ability to promote precision genome editing in different human cell lines using a large insert was validated. To this end, a promoter less GFP expression cassette for the targeted insertion of the GFP gene at the human AAVS1 locus was generated. The donor template contained 700 base pairs homology regions flanking a promoter-trap cassette composed of a splice acceptor (SA) and the coding sequence for a T2A self-cleaving peptide fused to the GFP gene. Upon integration in the first intron of the target gene, the transcripts derived from the AAVS1 promoter undergo alternative splicing using the newly integrated SA thus securing GFP expression (FIG. 11A).

Figure 11B:
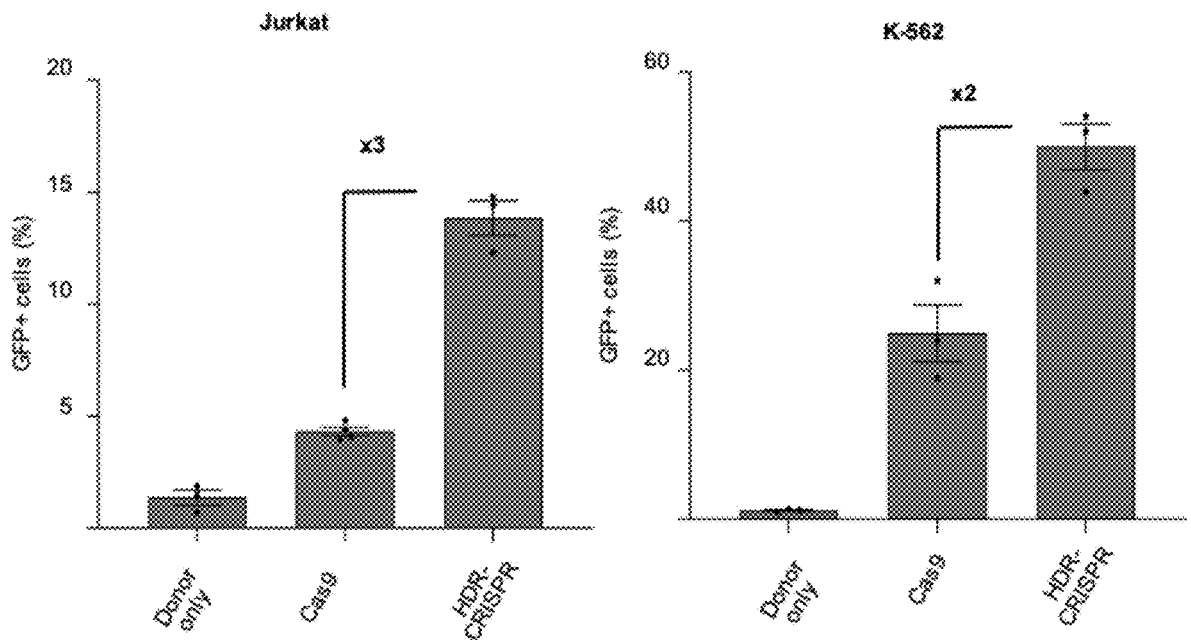

HDR-CRISPR efficiency was assessed in two cell lines widely used as surrogate models for hematopoietic cell types, namely the K562 erythroleukemic cell line and the Jurkat T lymphoblastic cell line. The genome editing components were delivered, including the nuclease, the donor template described above and an AAVS1-specific sgRNA, via nucleofection. Nine days later, cells stably expressing GFP, indicative of precise AAVS1 editing, were measured via flow cytometry. In line with the previous experiments in the reporter cell lines, HDR-CRISPR outperformed the canonical Cas9 with an increase in targeted gene addition ranging from 2- to 3-fold in K562 or Jurkat cell lines, respectively, further validating the ability of HDR-CRISPR for precision genome editing in different cellular contexts (FIG. 11B).

In the context of therapeutic genome editing, adeno associated viruses (AAV) are largely used to deliver the DNA repair template into the target cells. The ability of HDR-CRISPR to promote precision editing in the presence of an AAV-derived repair matrix was tested. AAV serotype 6 (AAV2/6) containing a GFP expression cassette driven by the PGK promoter was generated. The vector included a promoter-trap cassette to express puromycin resistance (PuroR) under the control of the AAVS1 promoter and homology arms to the AAVS1 gene as described above (FIG. 11C).

K562 cells were firstly nucleofected with the two plasmids expressing the nucleases or the sgRNA, respectively, and immediately transduced with the AAV donor template. Cells receiving only the AAV donor showed a transient GFP expression that was undetectable by day 9.

Figure 11C:
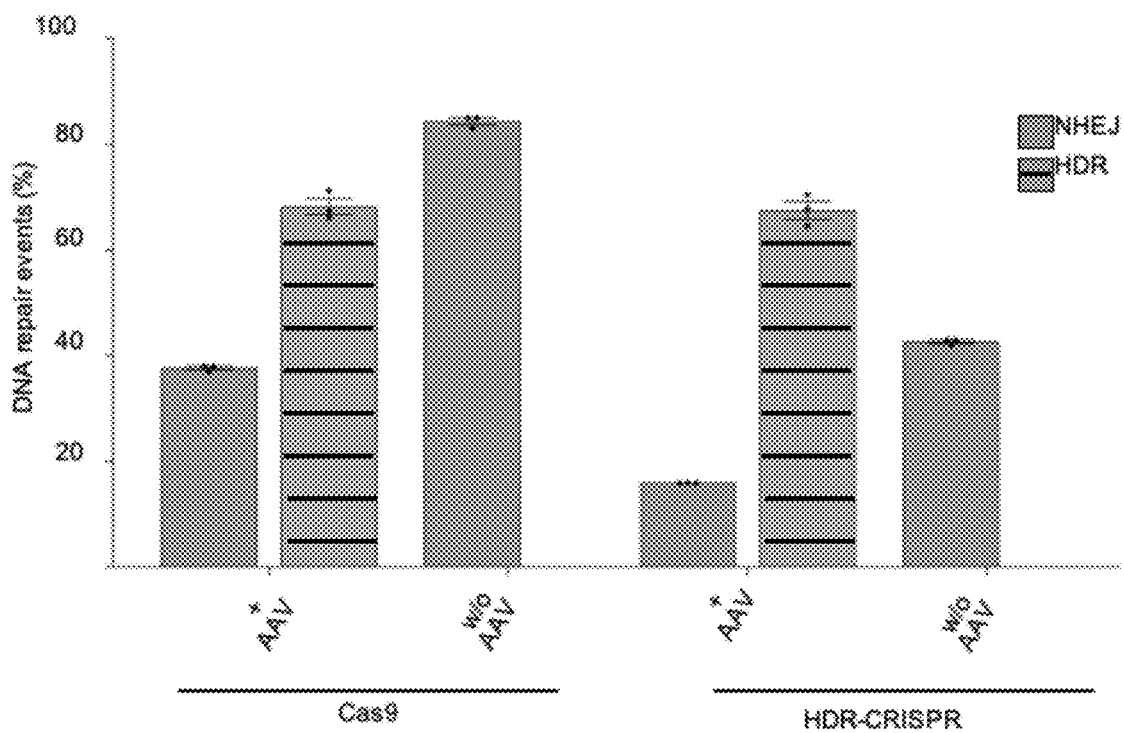
Figure 11D:
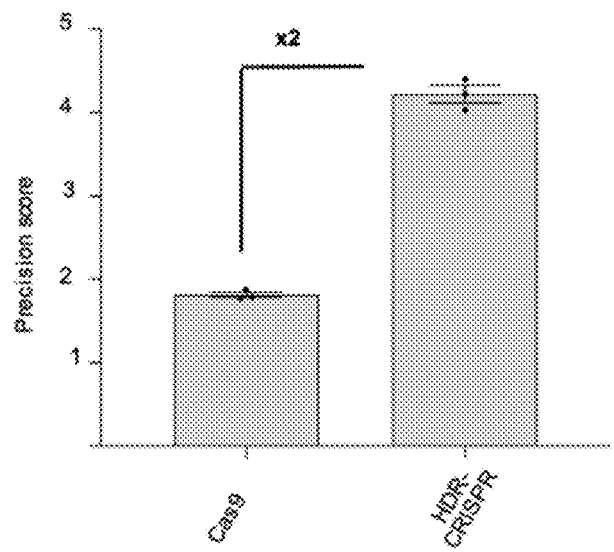

In contrast, the two nuclease tested samples were capable to promote targeted integration of the GFP expression cassette resulting in about 70% of the cells expressing GFP 9 days after nucleofection (FIG. 11C). Since NHEJ-mediated DSB repair results in genotoxic indel mutations at the nuclease target site, side-by-side the genotoxicity potential of the nuclease used were compared. To this end, the indel mutational landscape at the AAVS1 target site using TIDE was profiled. Interestingly, besides a similar HDR frequency (FIG. 11C), HDR-CRISPR resulted in significantly lower mutational burden with almost 2-fold reduction in total indels at the target site as compared to canonical Cas9 (20% Vs. 43%, respectively; FIG. 11C). As a consequence, precision genome editing score computed 2-fold higher as compared to Cas9 (FIG. 11D).

Importantly, the use of HDR-CRISPR resulted in a robust reduction of the highly genotoxic out-of-frame+1 insertion mutation, which is predominant in the context of genome editing using the CRISPR-Cas9 system.

Example 8

Figure 12A:
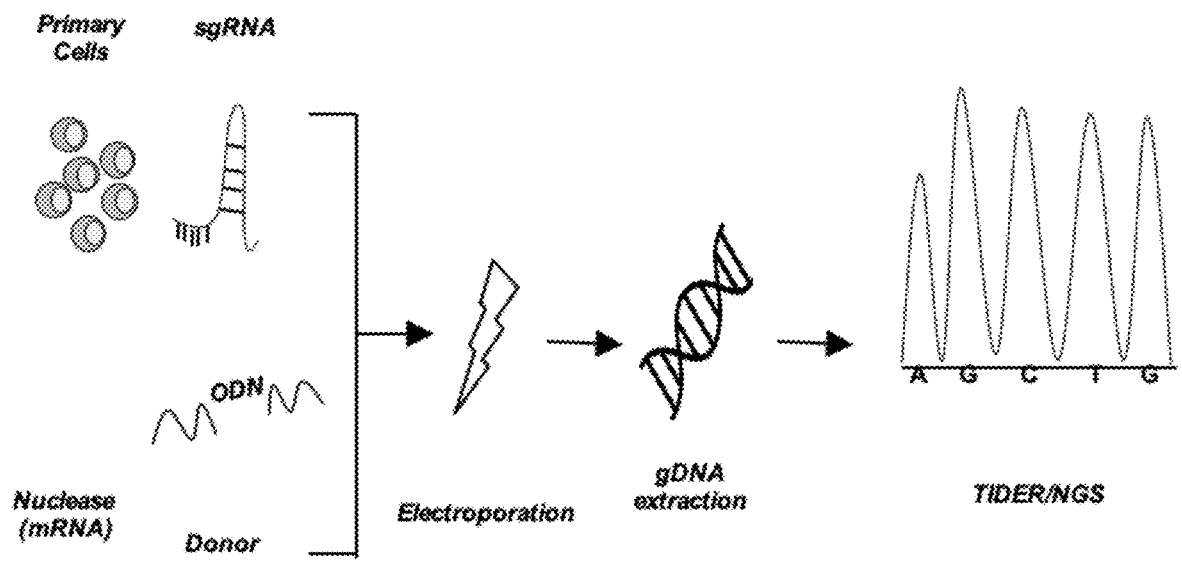
FIGS. 12A-G show the results of Example 8.

HDR-CRISPR is Less Genotoxic and Stimulates Seamless Gene Editing in Primary Human T Lymphocytes and Hematopoietic Stem Cells Having established HDR-CRISPR as a safer and efficient tool for precision gene editing in cell lines, its ability to install a point mutation was assessed in clinically relevant primary human hematopoietic cells, such as T lymphocytes and hematopoietic stem cells (HSCs). Since these cells do not tolerate plasmid DNA for the expression of genome editing tools, the nucleases were delivered in form of in vitro transcribed mRNA alongside with a chemically modified sgRNA targeted to site #2 in the exon 3 of the CCR5 gene (i.e. CCR5$^{\#2}$), previously validated in our laboratory. Both ssODN and dsODN were designated to introduce a silent nucleotide change to abolish the protospacer-adjacent motif (PAM) and avoid Cas9 activity upon editing (FIG. 12A).

Figure 12B:
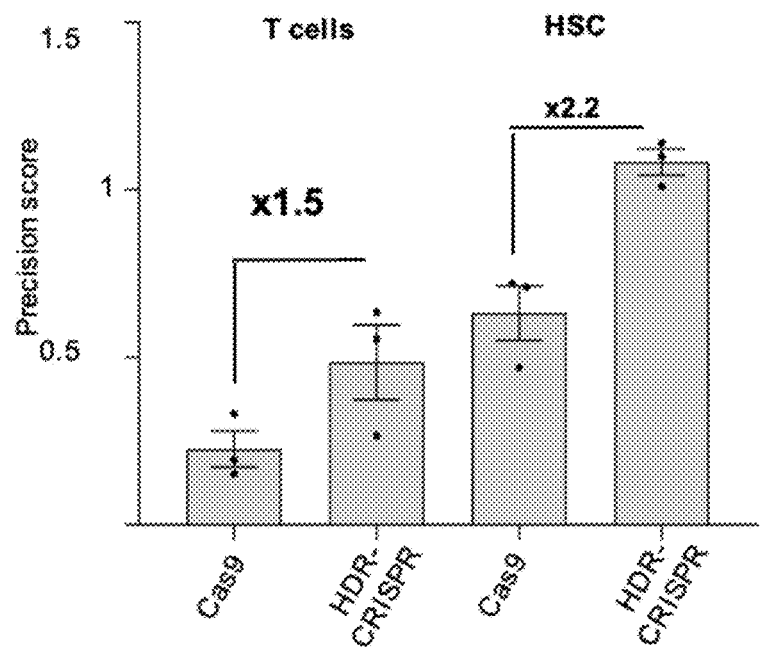

Gene editing components where nucleofected in activated HSC or T cells following previously established protocols and the frequencies of DSBs resolved either via NHEJ or HDR were measured via TIDER. In both cell types tested, HDR-CRISPR promoted an increase in precision score ranging from 1.5-fold and up to 2.2-fold in primary HSC or T cells respectively as compared to canonical Cas9 (FIG. 12B).

Figures 12C, 12D:
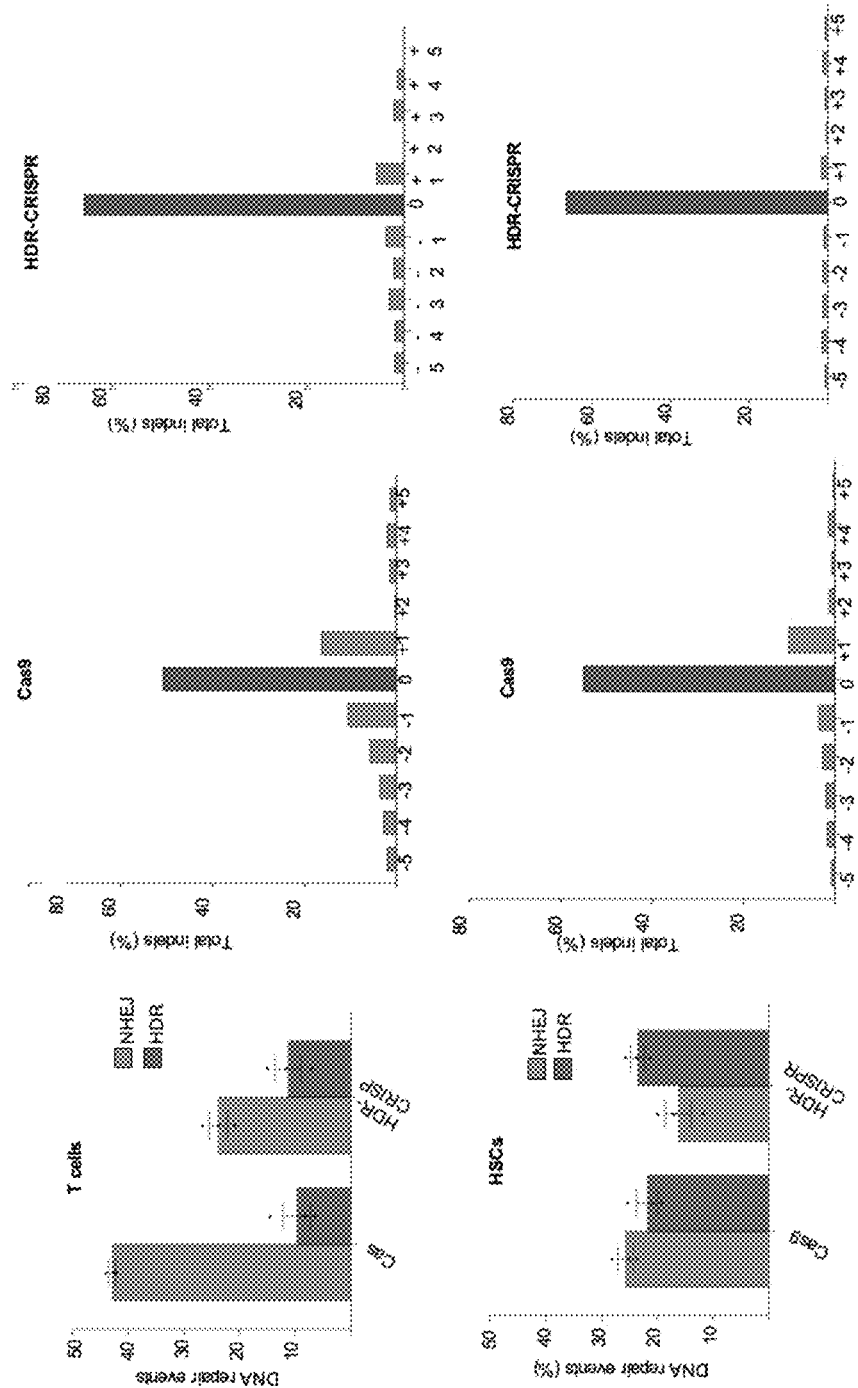

TIDER analysis indicated that both Cas9 and HDR-CRISPR supported similar levels of HDR-mediated DSB repair as they were both capable of installing the desired nucleotide change with similar efficiencies in both cell types (FIG. 12C, left panels). However, as compared to the canonical Cas9, HDR-CRISPR ensued a robust reduction of genotoxic indel mutations at the target site, such as the predominant out-of-frame+1 insertion, in line with previous results in cell lines (FIG. 12C and FIG. 12D). Given the accuracy in targeted genome editing, it was intended to determine the effect of HDR-CRISPR at off target cleavage in primary HSCs. Since the CCR5$^{\#2}$-specific CRISPR-Cas system described above did not show any sign of off target cleavage in previous report, we the specificity of HDR-CRISPR was profiled using an sgRNA targeting the CCR5 site #1 (i.e. CCR5$^{\#1}$) for which the occurrence of indel mutations were previously validated at one prominent off target site in our laboratory. Genomic DNA from HSC receiving either the canonical CRISPR-Cas9 or HDR-CRISPR targeting CCR5$^{\#2}$ was extracted 2 days after nucleofection.

Considering the low frequency of off target indels previously detected, to increase the sensitivity of the analysis targeted next generation sequencing (NGS) of PCR amplicons encompassing the CCR5$^{\#}$ on and off target sites was performed.

Figure 12E:
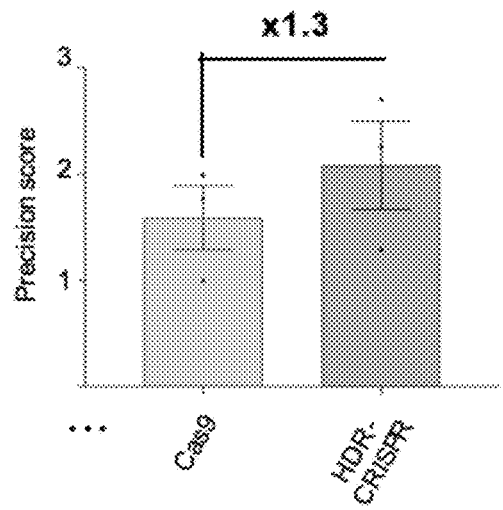
Figure 12F:
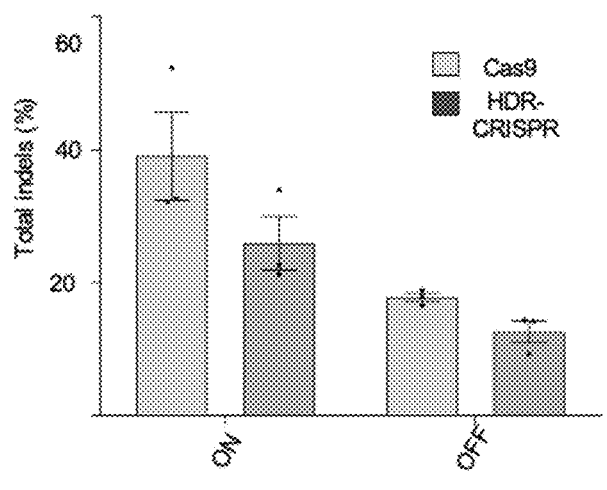
Figure 12G:
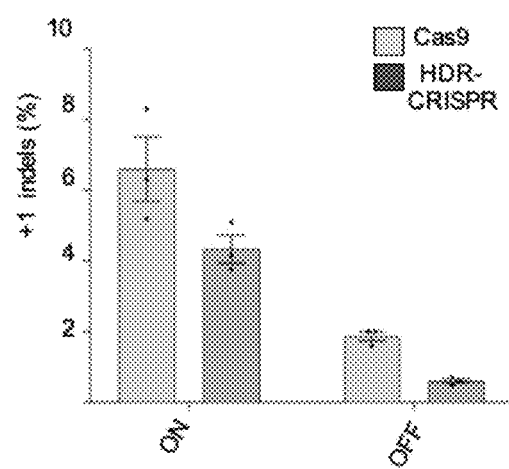

While the analysis of the target site confirmed an increase of 1.3-fold in precision score (FIG. 12E), HDR-CRISPR resulted in overall reduced NHEJ-mediated mutagenesis at previously validated off target site (FIG. 12F) with a robust reduction of the genotoxic +1 insertion in line with previous experiments (FIG. 12G). These results highlight the increased safety of genome editing using HDR-CRISPR as compared to benchmark CRISPR-Cas9.

The invention claimed is:

1. A fusion protein comprising (1) wild type *Streptococcus pyogenes* Cas9 nuclease, (2) full-length, unmodified human C-terminal binding protein interacting protein (CtIP) and (3) the polypeptide of SEQ ID NO: 2.

2. A nucleic acid coding for the fusion protein according to claim 1.

3. The nucleic acid according to claim 2 characterized in that said nucleic acid is a DNA sequence.

4. The nucleic acid according to claim 2 characterized in that said nucleic acid is an mRNA sequence.

5. A vector for the transfection of target cells characterized in that said vector comprises a nucleic acid according to claim 2.

6. The vector according to claim 5 characterized in that said vector is a plasmid.

7. The vector according to claim 5, wherein said vector is a recombinant viral vector.

8. A method for editing genomic sequences via homology directed repair using the fusion protein of claim 1, said method comprising the steps of:
   (i) introducing said fusion protein and a guide RNA (gRNA) in a human cell, whereby said fusion protein generates a double stranded break at a specific site in the genome of said human cell to yield two cleaved genomic strands; and
   (ii) transferring into said cell a complementary donor template designed to rejoin the cleaved genomic strands by means of homology directed repair.

9. The vector according to claim 7, wherein said recombinant viral vector is selected from the group consisting of adenoviral vectors, adeno-associated viral vectors, lentiviral vectors, and retroviral vectors.

10. An engineered CRISPR-Cas9 system for editing genomic sequences, said system comprising (1) the fusion protein of claim 1 and (2) a chimeric single guide RNA (gRNA) in the form of a single strand RNA molecule that consists of (a) 20 nucleotides complementary to a selected genomic sequence and (b) a remaining portion that folds into a tridimensional structure capable of forming a complex with the wild type *Streptococcus pyogenes* Cas9 nuclease portion of said fusion protein.

11. A method for editing genomic sequences via homology directed repair, said method comprising the step of:
   a. delivering into a human cell the engineered CRISPR-Cas9 system of claim 10, whereby said complementary nucleotides of said gRNA hybridize to a corresponding complementary section of said cell's genome while said remaining gRNA portion forms a tridimensional complex with the wild type *Streptococcus pyogenes* Cas9 nuclease portion of said fusion protein capable of cleaving said genome into two genomic strands;
   b. generating a double stranded break in said cell's genome at the site of hybridization; and
   c. transferring into said cell a complementary donor template designed to rejoin the cleaved genomic strands at the site of hybridization by means of homology directed repair.

12. The method of claim 11, wherein said human cell comprises primary human T lymphocytes or hematopoietic stem cells (HSC).

* * * * *